United States Patent
Sasaki et al.

(10) Patent No.: US 9,076,465 B1
(45) Date of Patent: Jul. 7, 2015

(54) MAGNETIC HEAD INCLUDING A FIRST AND SECOND INSULATING FILM BETWEEN A COIL ELEMENT AND A WRITE SHIELD

(71) Applicants: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Yukinori Ikegawa, Milpitas, CA (US); Hironori Araki, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Yukinori Ikegawa, Milpitas, CA (US); Hironori Araki, Milpitas, CA (US); Tatsuya Shimizu, Hong Kong (CN)

(73) Assignees: HEADWAY TECHNOLOGIES, INC., Milpitas, CA (US); SAE MAGNETICS (H.K.) LTD., Hong Kong (CN)

(*) Notice: Subject to any disclaimer, the term of this patent is extended or adjusted under 35 U.S.C. 154(b) by 8 days.

(21) Appl. No.: 14/107,546

(22) Filed: Dec. 16, 2013

(51) Int. Cl.
G11B 5/127 (2006.01)
G11B 5/17 (2006.01)
G11B 5/11 (2006.01)
G11B 5/31 (2006.01)

(52) U.S. Cl.
CPC .. *G11B 5/17* (2013.01); *G11B 5/11* (2013.01); *G11B 5/1278* (2013.01); *G11B 5/3123* (2013.01)

(58) Field of Classification Search
USPC .............. 360/123.02, 123.03, 123.06, 123.1, 360/125.02, 125.03, 125.3, 123.09
See application file for complete search history.

(56) References Cited

U.S. PATENT DOCUMENTS

| | | | | |
|---|---|---|---|---|
| 7,215,502 B2* | 5/2007 | Tagami | ...................... | 360/77.08 |
| 7,219,414 B2* | 5/2007 | Watabe et al. | ............. | 29/603.13 |
| 7,612,963 B2* | 11/2009 | Allen et al. | ............... | 360/123.06 |
| 7,755,864 B2* | 7/2010 | Kato et al. | ................. | 360/234.5 |
| 7,924,528 B2* | 4/2011 | Sasaki et al. | ............. | 360/125.15 |
| 8,035,922 B2* | 10/2011 | Lille et al. | ................. | 360/123.06 |
| 8,201,320 B2* | 6/2012 | Allen et al. | ................. | 29/603.16 |
| 8,233,235 B2* | 7/2012 | Chen et al. | ............... | 360/125.15 |
| 8,274,759 B1* | 9/2012 | Sasaki et al. | ............. | 360/125.13 |
| 8,295,008 B1* | 10/2012 | Sasaki et al. | ............. | 360/125.02 |
| 8,345,382 B1* | 1/2013 | Sasaki et al. | ............. | 360/123.06 |
| 8,385,019 B1* | 2/2013 | Sasaki et al. | ............. | 360/123.03 |
| 8,416,528 B1* | 4/2013 | Sasaki et al. | ............. | 360/125.02 |
| 8,422,166 B1* | 4/2013 | Sasaki et al. | ............. | 360/123.06 |
| 8,441,755 B2* | 5/2013 | Sasaki et al. | ............. | 360/123.03 |
| 8,503,130 B1* | 8/2013 | Sasaki et al. | ............. | 360/123.06 |
| 8,767,347 B1* | 7/2014 | Sasaki et al. | ............. | 360/125.13 |
| 8,867,169 B2* | 10/2014 | Sasaki et al. | ............. | 360/125.26 |
| 2008/0151424 A1* | 6/2008 | Bedell et al. | ............. | 360/123.19 |

* cited by examiner

Primary Examiner — Brian Miller
(74) Attorney, Agent, or Firm — Oliff PLC

(57) ABSTRACT

A magnetic head includes a coil, a main pole, a write shield, a first insulating film, and a second insulating film. The coil includes a specific coil element. The main pole has a top surface including an inclined surface portion and a flat surface portion. The write shield includes an inclined portion. The inclined portion includes a first portion opposed to the inclined surface portion, and a second portion located farther from a medium facing surface than the first portion. The specific coil element includes an interposition part interposed between the flat surface portion and the second portion. The first insulating film is interposed between the inclined surface portion and the first portion of the inclined portion, and between the interposition part and the second portion of the inclined portion. The second insulating film is interposed between the first insulating film and the second portion of the inclined portion.

7 Claims, 8 Drawing Sheets

MAGNETIC HEAD INCLUDING A FIRST AND SECOND INSULATING FILM BETWEEN A COIL ELEMENT AND A WRITE SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that includes a main pole and a shield.

2. Description of the Related Art

The recording systems of magnetic read/write apparatuses include a longitudinal magnetic recording system in which signals are magnetized in a direction along the plane of a recording medium (the longitudinal direction) and a perpendicular magnetic recording system in which signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole allows a magnetic flux corresponding to the magnetic field produced by the coil to pass, and produces a write magnetic field from its end face.

A magnetic head for use in a magnetic disk drive such as a hard disk drive is typically provided in a slider. The slider has the medium facing surface. The medium facing surface has an air inflow end (a leading end) and an air outflow end (a trailing end). The slider is designed to slightly fly over the surface of a recording medium by means of an airflow that comes from the air inflow end into the space between the medium facing surface and the recording medium.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide area track erasure (WATE). To achieve higher recording densities, it is necessary to prevent the unwanted erasure.

A known technique for preventing the unwanted erasure induced by a skew is to configure the main pole so that its end face located in the medium facing surface decreases in width with increasing proximity to the top surface of the substrate, as described in U.S. Pat. No. 8,385,019 B1, for example. U.S. Pat. No. 8,385,019 B1 also describes a technique for configuring the main pole so that its thickness in the vicinity of the medium facing surface decreases with increasing proximity to the medium facing surface.

In order to prevent the unwanted erasure induced by a skew, it is also effective to reduce the thickness of the main pole in the medium facing surface. If the entire main pole is thinned, however, the main pole becomes small in cross-sectional area perpendicular to the direction in which magnetic flux flows. This makes it difficult for the main pole to guide much magnetic flux to the medium facing surface, thus leading to degradation of overwrite property.

Configuring the main pole so that its thickness in the vicinity of the medium facing surface decreases with increasing proximity to the medium facing surface as described in U.S. Pat. No. 8,385,019 B1 allows the main pole to have a small thickness in the medium facing surface and a large thickness in a portion away from the medium facing surface, thereby making it possible for the main pole to guide much magnetic flux to the medium facing surface.

Further, in order to prevent the unwanted erasure induced by a skew and achieve higher recording densities, it is effective to provide a write shield having an end face that is located in the medium facing surface at a position on the front side in the direction of travel of the recording medium relative to the end face of the main pole, as described in U.S. Pat. No. 8,385,019 B1.

A magnetic head having the write shield is typically provided with a return path section for connecting the write shield and part of the main pole located away from the medium facing surface to each other. The write shield, the return path section and the main pole define a space through which a coil portion passes. The write shield and the return path section have the function of capturing a magnetic flux that is produced from the end face of the main pole and spreads in directions other than the direction perpendicular to the plane of the recording medium, thereby preventing the magnetic flux from reaching the recording medium. The write shield and the return path section also have the function of allowing a magnetic flux that has been produced from the end face of the main pole and has magnetized the recording medium to flow back to the main pole.

The position of an end of a record bit to be recorded on the recording medium is determined by the position of an end of the end face of the main pole located in the medium facing surface, the end being located on the front side in the direction of travel of the recording medium. In order to define the position of the end of the record bit accurately, it is therefore important that the write shield have an end face that is located in the medium facing surface at a position on the front side in the direction of travel of the recording medium relative to the end face of the main pole and that this end face of the write shield capture a magnetic flux that is produced from the end face of the main pole and spreads in directions other than the direction perpendicular to the plane of the recording medium. The magnetic head having the write shield allows for prevention of the unwanted erasure and is able to provide a further improved recording density.

In view of the foregoing, in order to prevent the unwanted erasure induced by a skew and provide a higher recording density, the magnetic head can conceivably be configured so that a portion of the top surface of the main pole in the vicinity of the medium facing surface is formed into an inclined portion inclined relative to a direction perpendicular to the medium facing surface, and the write shield is provided with an inclined surface opposed to the inclined portion of the main pole, as described in U.S. Pat. No. 8,385,019 B1.

In the above-described configuration, however, if the inclined portion of the top surface of the main pole and the inclined surface of the write shield are opposed to each other over a large area with a small spacing therebetween, there arises a problem that much magnetic flux leaks from the main pole to the write shield to cause degradation of write characteristics such as the overwrite property.

To avoid this, the inclined portion may be made smaller than the inclined surface in length in the direction perpendicular to the medium facing surface, as described in U.S. Pat. No. 8,385,019 B1. In this configuration, the inclined surface includes a first portion opposed to the inclined portion, and a second portion contiguous with the first portion and located farther from the medium facing surface than the first portion. The distance between the second portion and a portion of the top surface of the main pole that is located farther from the medium facing surface than is the inclined portion is greater than the distance between the first portion and the inclined portion of the top surface of the main pole. This configuration allows for prevention of the leakage of magnetic flux from the main pole to the write shield.

With increases in frequency of write signals for higher recording densities, it is required of the magnetic head to provide an improved rate of change in the direction of the magnetic flux produced from the end face of the main pole. To satisfy this requirement, it is effective to reduce the length of a magnetic path that passes through the write shield, the return path section and the main pole.

U.S. Pat. No. 8,385,019 B1 describes the following configuration. Specifically, in the described configuration, the top surface of the main pole includes the inclined portion mentioned above and a flat portion that is located farther from the medium facing surface than is the inclined portion. The write shield has the inclined surface including the first and second portions mentioned above. The coil includes a portion located between the flat portion and the second portion. This configuration allows for a reduction in length of the magnetic path passing through the write shield, the return path section and the main pole.

The above-described configuration, however, has room for improvement in view of the following. Specifically, in the above-described configuration, the portion of the coil located between the flat portion and the second portion is opposed to the second portion with a thin insulating layer interposed therebetween. Accordingly, when a current is passed through the coil, a puncture may occur in the thin insulating layer to cause shorting of the coil and the write shield.

OBJECT AND SUMMARY OF THE INVENTION

It is an object of the present invention to provide a magnetic head for perpendicular magnetic recording that is capable of preventing the unwanted erasure induced by a skew, reducing the length of the magnetic path passing through the write shield, the return path section and the main pole, and preventing shorting of the coil and the write shield.

A magnetic head for perpendicular magnetic recording of the present invention includes; a medium facing surface facing a recording medium; a coil producing a magnetic field that corresponds to data to be written on the recording medium; a main pole; a write shield; and a first return path section. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The write shield is formed of a magnetic material and has an end face located in the medium facing surface. The first return path section is formed of a magnetic material and located on the front side in the direction of travel of the recording medium relative to the main pole.

The end face of the write shield includes a first end face portion located on the front side in the direction of travel of the recording medium relative to the end face of the main pole. The first return path section connects the write shield and part of the main pole located away from the medium facing surface to each other so that a first space is defined by the main pole, the write shield and the first return path section. The coil includes at least one first coil element extending to pass through the first space.

The main pole has a top surface lying at the front end in the direction of travel of the recording medium. The top surface of the main pole includes an inclined surface portion and a flat surface portion arranged in this order, the inclined surface portion being closer to the medium facing surface than the flat surface portion. The inclined surface portion has a first end located in the medium facing surface and a second end opposite to the first end. The inclined surface portion is inclined relative to the medium facing surface and a direction perpendicular to the medium facing surface such that the second end is located on the front side in the direction of travel of the recording medium relative to the first end. The flat surface portion extends substantially perpendicular to the medium facing surface.

The write shield includes an inclined portion facing toward the top surface of the main pole. The inclined portion has a third end located in the medium facing surface and a fourth end opposite to the third end. The inclined portion is inclined relative to the medium facing surface and the direction perpendicular to the medium facing surface such that the fourth end is located on the front side in the direction of travel of the recording medium relative to the third end. The inclined surface portion is smaller than the inclined portion in length in the direction perpendicular to the medium facing surface.

The inclined portion includes a first portion opposed to the inclined surface portion, and a second portion that is contiguous with the first portion and is located farther from the medium facing surface than is the first portion. The at least one first coil element includes one specific coil element. The one specific coil element includes an interposition part that is located closer to the medium facing surface than is the fourth end and interposed between the flat surface portion and the second portion. The interposition part has an end face facing toward the inclined portion.

The magnetic head of the present invention further includes a first insulating film and a second insulating film. The first insulating film is interposed between the inclined surface portion and the first portion of the inclined portion, and between the end face of the interposition part and the second portion of the inclined portion. The second insulating film is interposed between the first insulating film and the second portion of the inclined portion. The first insulating film has a first front end located in the medium facing surface. The second insulating film has a second front end closest to the medium facing surface. The second front end of the second insulating film is located at a distance from the medium facing surface.

In the magnetic head of the present invention, the distance from the medium facing surface to the second front end of the second insulating film may be greater than or equal to the distance from the medium facing surface to the second end of the inclined surface portion and smaller than or equal to the distance from the medium facing surface to the interposition part.

The magnetic head of the present invention may further include a third insulating film. The third insulating film is interposed between the second insulating film and the second portion of the inclined portion. The third insulating film has a third front end closest to the medium facing surface. The third front end is located farther from the medium facing surface than is the second front end. Where the magnetic head includes the third insulating film, the distance from the medium facing surface to the second front end of the second insulating film may be greater than or equal to the distance from the medium facing surface to the second end of the inclined surface portion and smaller than the distance from the medium facing surface to the interposition part. Further, the distance from the medium facing surface to the third front end of the third insulating film may be greater than the distance from the medium facing surface to the second front end of the second insulating film and smaller than or equal to the distance from the medium facing surface to the interposition part.

The magnetic head of the present invention may further include an insulating layer located between the one specific coil element and the flat surface portion of the top surface of the main pole. In such a case, each of the one specific coil element and the insulating layer may have an end face facing toward the inclined portion. The inclined surface portion, the end face of the insulating layer, and the end face of the one specific coil element may be coplanar.

In the magnetic head of the present invention, the end face of the write shield may include a second end face portion located on the rear side in the direction of travel of the recording medium relative to the end face of the main pole. In such a case, the magnetic head may further include a second return path section formed of a magnetic material and located on the rear side in the direction of travel of the recording medium relative to the main pole. The second return path section may connect the write shield and part of the main pole located away from the medium facing surface to each other so that a second space is defined by the main pole, the write shield and the second return path section. The coil may include at least one second coil element extending to pass through the second space.

In the magnetic head of the present invention, the end face of the write shield may further include a third end face portion and a fourth end face portion. In such a case, the third end face portion and the fourth end face portion may be located on opposite sides of the end face of the main pole in the track width direction.

In the magnetic head of the present invention, the top surface of the main pole includes the inclined surface portion. This allows the main pole to have a small thickness in the medium facing surface and a large thickness in a portion thereof that is located farther from the medium facing surface than is the inclined surface portion. Furthermore, in the present invention, the inclined surface portion is smaller than the inclined portion of the write shield in length in the direction perpendicular to the medium facing surface. This allows for a reduction in the area in which the inclined surface portion and the inclined portion are opposed to each other, and thereby allows for prevention of leakage of magnetic flux from the main pole to the write shield. Consequently, the present invention makes it possible to prevent the unwanted erasure induced by a skew and to improve the write characteristics.

Further, in the present invention, the one specific coil element of the coil includes the interposition part that is located closer to the medium facing surface than is the fourth end of the inclined portion and interposed between the flat surface portion of the top surface of the main pole and the second portion of the inclined portion. The present invention thus allows for placement of coil elements in the first space with high space utilization efficiency. Consequently, the present invention makes it possible to reduce the length of the magnetic path passing through the write shield, the first return path section and the main pole.

Further, in the present invention, the first and second insulating films are interposed between the second portion of the inclined portion of the write shield and the interposition part which is a portion of the coil. The first front end of the first insulating film is located in the medium facing surface, whereas the second front end of the second insulating film is located at a distance from the medium facing surface. The present invention thereby makes it possible to increase the insulation strength of the first and second insulating films interposed between the interposition part and the second portion of the inclined portion, while allowing the distance between the end face of the main pole and the first end face portion of the end face of the write shield in the medium facing surface to be of a desired value. Consequently, the present invention makes it possible to prevent shorting of the coil and the write shield.

Other objects, features and advantages of the present invention will become fully apparent from the following description.

DETAILED DESCRIPTION OF THE PREFERRED EMBODIMENTS

First Embodiment

Figure 2:
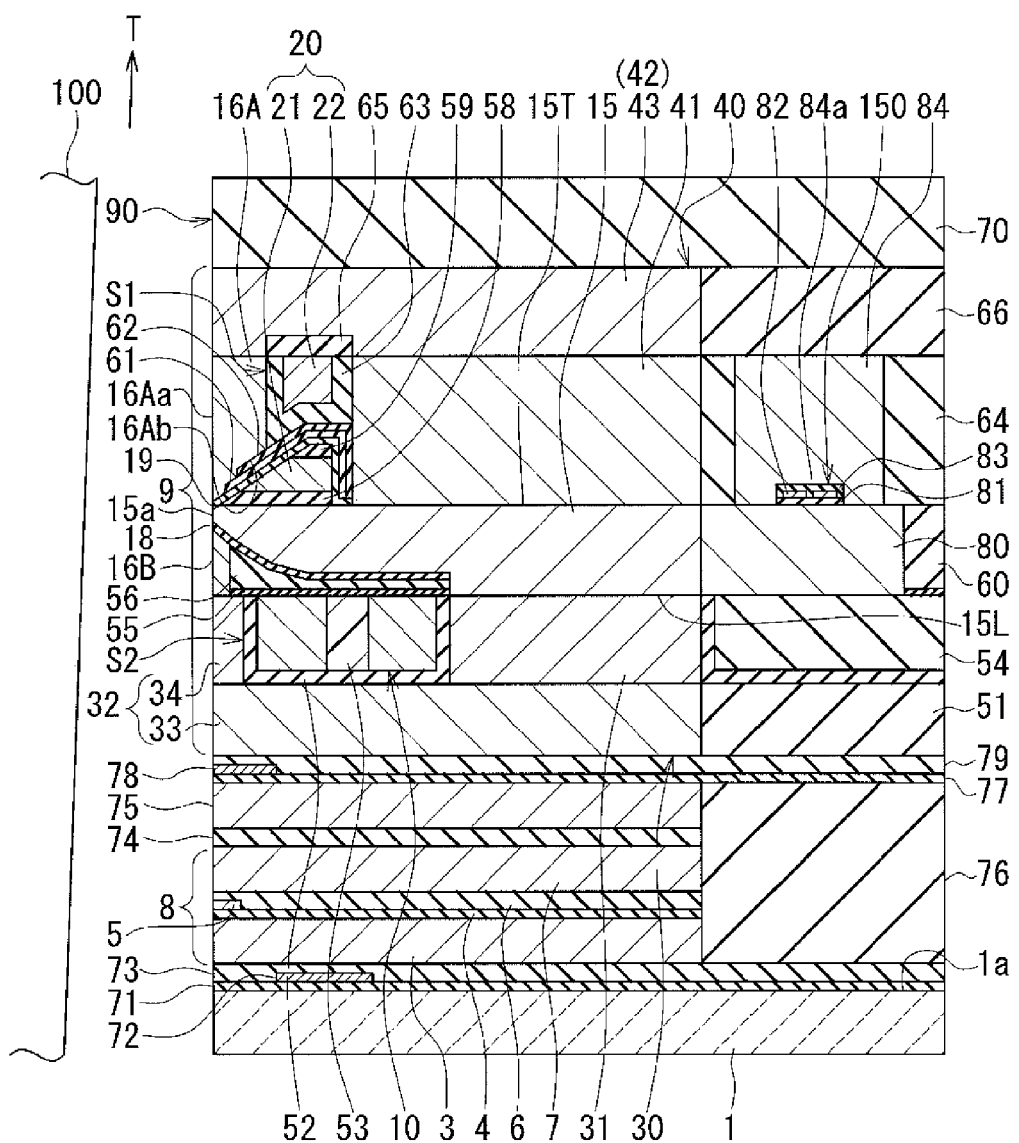
FIG. 2 is a cross-sectional view of the magnetic head according to the first embodiment of the invention.
Figure 3:
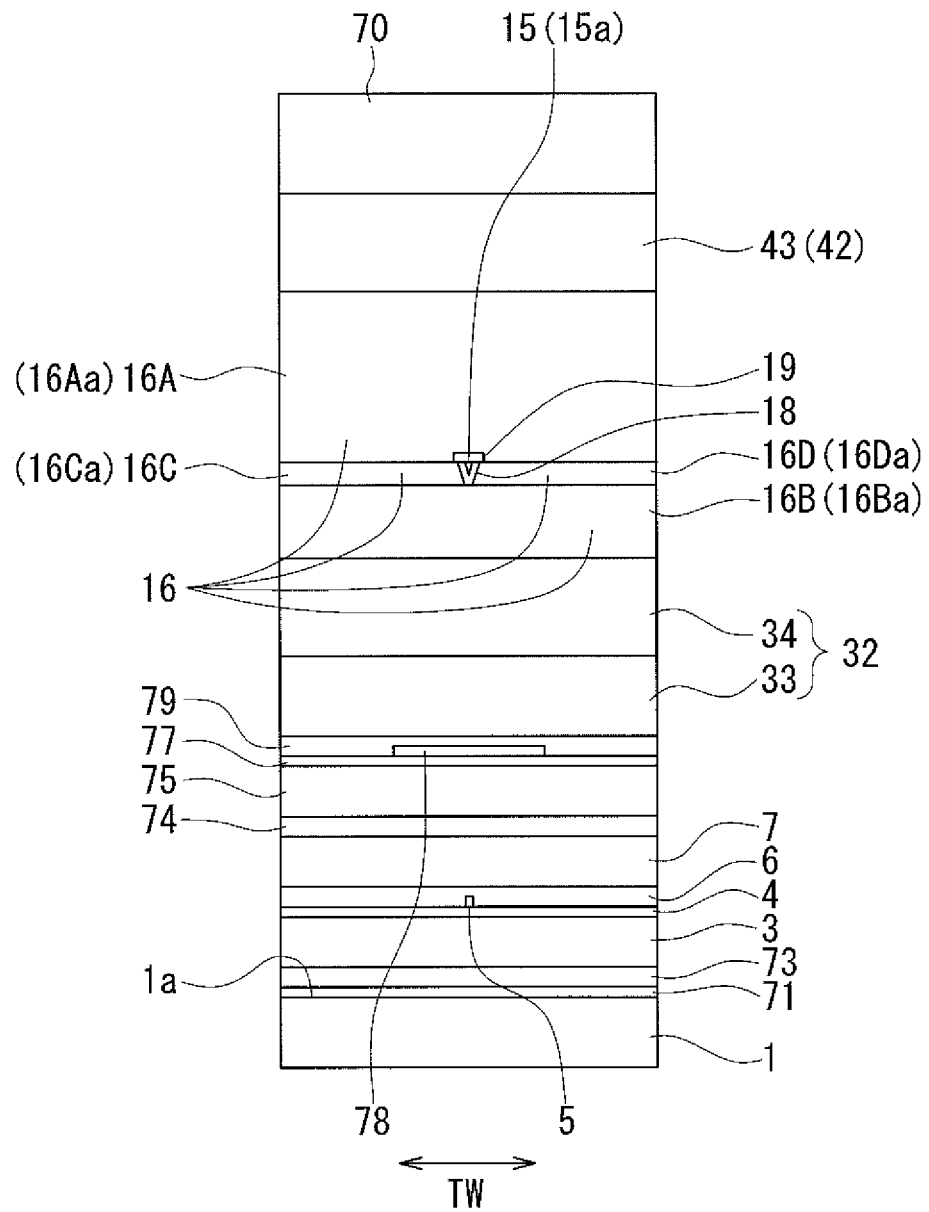
FIG. 3 is a front view showing the medium facing surface of the magnetic head according to the first embodiment of the invention.
Figure 4:
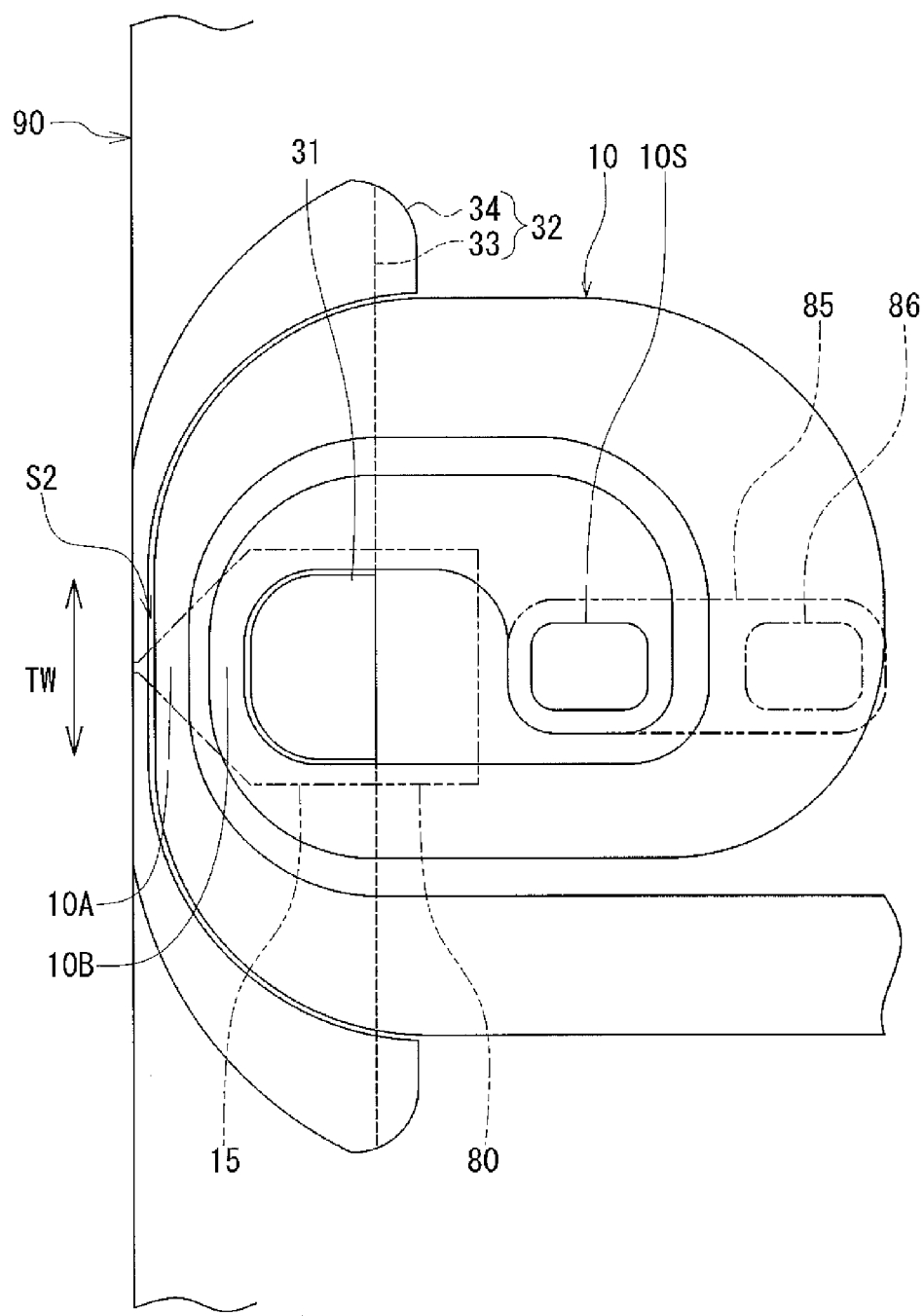
FIG. 4 is a plan view showing a second portion of a coil of the magnetic head according to the first embodiment of the invention.
Figure 5:
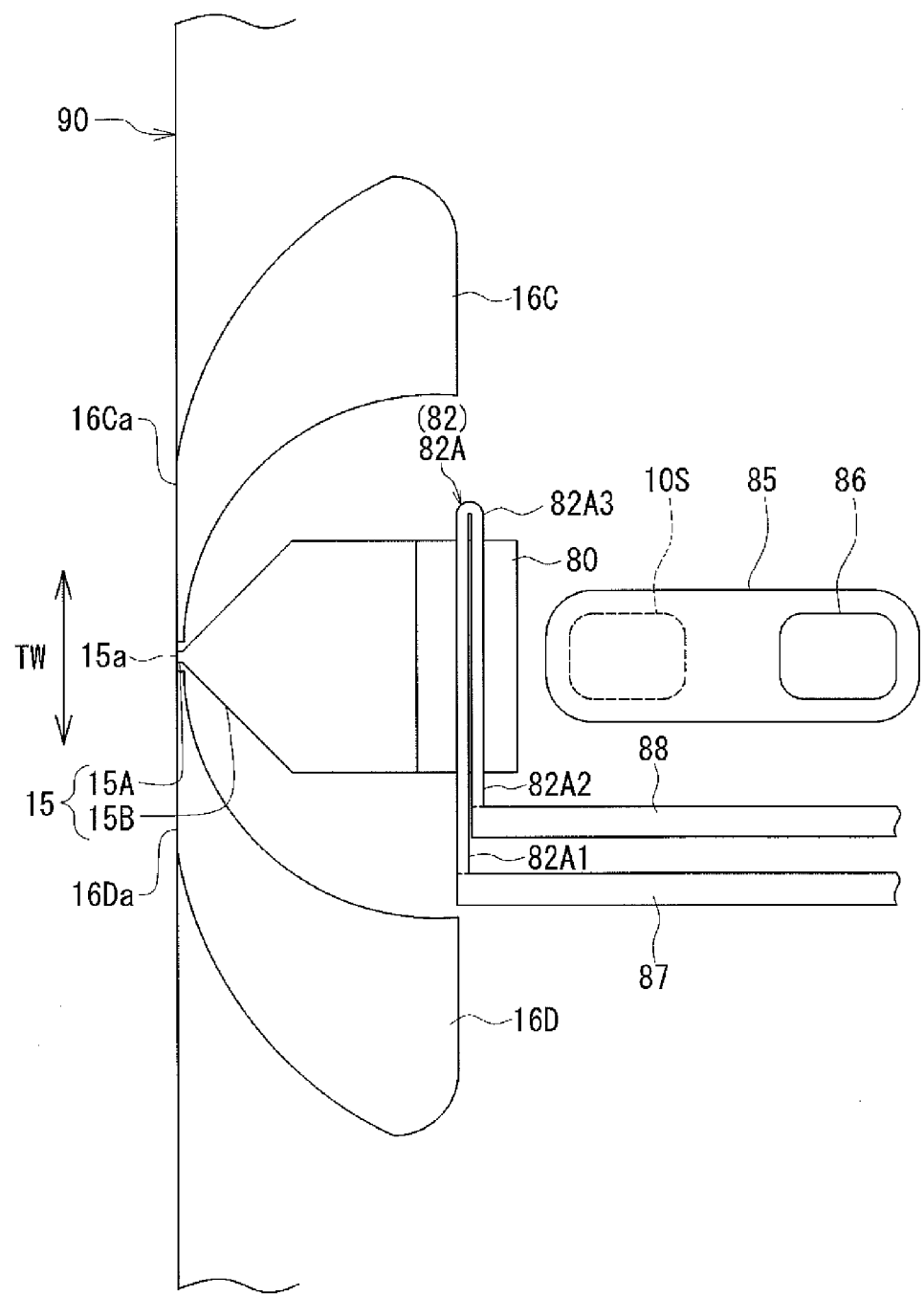
FIG. 5 is a plan view showing a main pole, an expansion member and a heater of the magnetic head according to the first embodiment of the invention.
Figure 6:
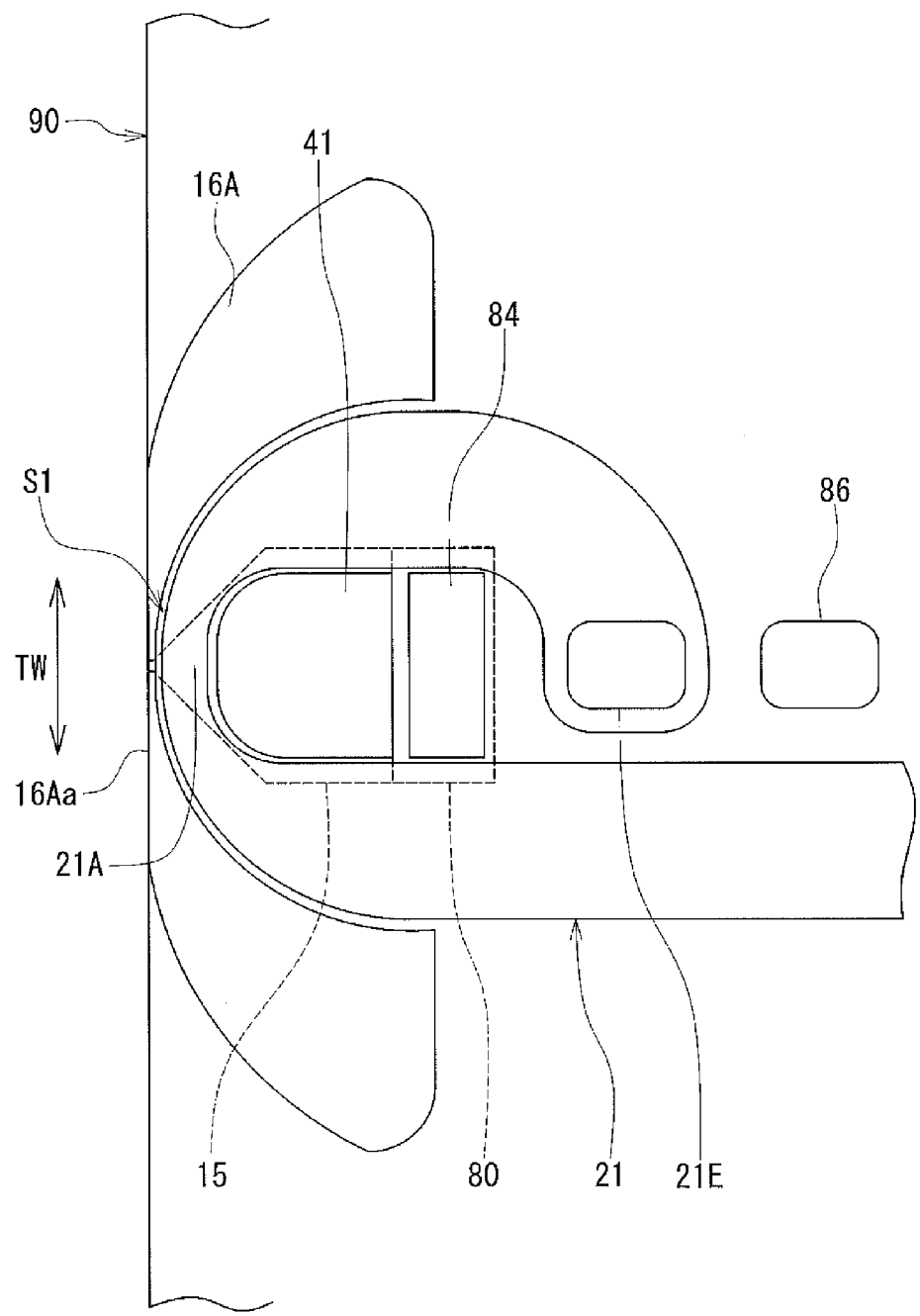
FIG. 6 is a plan view showing a first layer of a first portion of the coil of the magnetic head according to the first embodiment of the invention.
Figure 7:
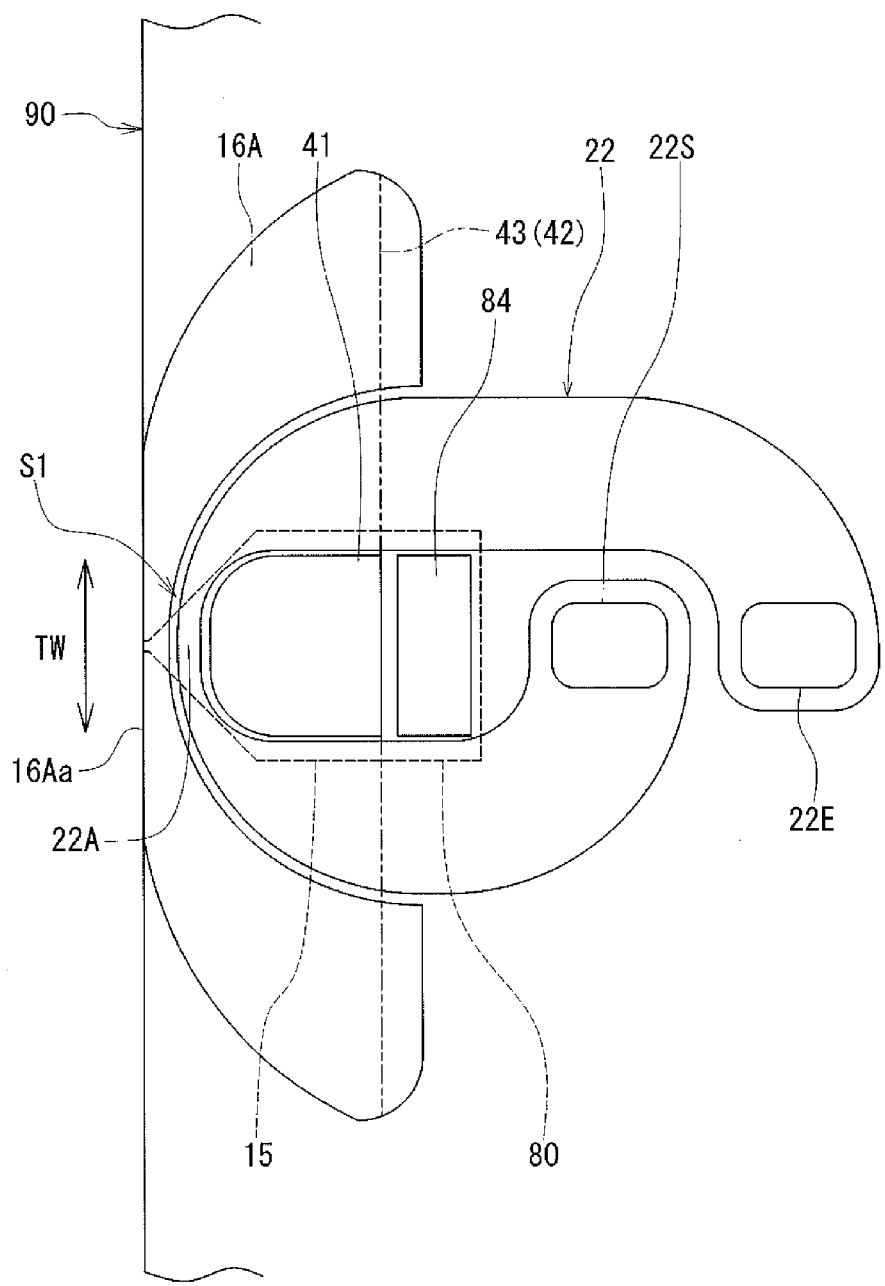
FIG. 7 is a plan view showing a second layer of the first portion of the coil of the magnetic head according to the first embodiment of the invention.

Preferred embodiments of the present invention will now be described in detail with reference to the drawings. First, reference is made to FIG. 2 to FIG. 7 to describe the configuration of a magnetic head according to a first embodiment of the invention. FIG. 2 is a cross-sectional view of the magnetic head according to the present embodiment. The arrow with the symbol T in FIG. 2 indicates the direction of travel of a recording medium. FIG. 3 is a front view showing the medium facing surface of the magnetic head according to the present embodiment. FIG. 4 is a plan view showing a second portion of a coil of the magnetic head according to the present embodiment. FIG. 5 is a plan view showing a main pole, an expansion member and a heater of the magnetic head according to the present embodiment. FIG. 6 is a plan view showing a first layer of a first portion of the coil of the magnetic head according to the present embodiment. FIG. 7 is a plan view showing a second layer of the first portion of the coil of the magnetic head according to the present embodiment. The arrow with the symbol TW in each of FIG. 3 to FIG. 7 indicates the track width direction.

The magnetic head for perpendicular magnetic recording (hereinafter simply referred to as the magnetic head) according to the present embodiment is for use in, for example, a magnetic disk drive and is in the form of a slider to fly over the surface of a rotating recording medium 100. As shown in FIG. 2, the magnetic head (the slider) has a medium facing surface 90 facing the recording medium 100. The medium facing surface 90 has an air inflow end (a leading end) and an air outflow end (a trailing end). The slider is designed to slightly fly over the surface of the recording medium 100 by means of an airflow that comes from the leading end into the space between the medium facing surface 90 and the recording medium 100.

Here, the side of the positions closer to the leading end relative to a reference position will be defined as the leading side, and the side of the positions closer to the trailing end relative to the reference position will be defined as the trailing side. The leading side is the rear side in the direction T of travel of the recording medium 100 relative to the slider. The trailing side is the front side in the direction T of travel of the recording medium 100 relative to the slider.

As shown in FIG. 2 and FIG. 3, the magnetic head includes a substrate 1 formed of a ceramic material such as aluminum oxide-titanium carbide ($Al_2O_3$—TiC) and having a top surface 1a, an insulating layer 71 formed of an insulating material and disposed on the top surface 1a of the substrate 1, a heater 72 disposed on the insulating layer 71, and an insulating layer 73 formed of an insulating material and disposed to cover the insulating layer 71 and the heater 72. The insulating layers 71 and 73 are formed of alumina ($Al_2O_3$), for example. The heater 72 will be described in detail later.

The magnetic head further includes a read head unit 8 located on the trailing side or the front side in the direction T of travel of the recording medium 100 relative to the insulating layer 73. The read head unit 8 includes a first read shield layer 3 formed of a magnetic material and disposed on the insulating layer 73, a first read shield gap film 4 which is an insulating film disposed to cover the first read shield layer 3, a magnetoresistive (MR) element 5 serving as a read element disposed on the first read shield gap film 4, a second read shield gap film 6 which is an insulating film disposed on the MR element 5, and a second read shield layer 7 formed of a magnetic material and disposed on the second read shield gap film 6.

An end of the MR element 5 is located in the medium facing surface 90. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The magnetic head further includes a nonmagnetic layer 74 formed of a nonmagnetic material and disposed on the second read shield layer 7, a middle shield layer 75 formed of a magnetic material and disposed on the nonmagnetic layer 74, and a nonmagnetic layer 76 formed of a nonmagnetic material and disposed around the read head unit 8, the nonmagnetic layer 74 and the middle shield layer 75. The nonmagnetic layers 74 and 76 are formed of alumina, for example.

The magnetic head further includes a nonmagnetic layer 77 formed of a nonmagnetic material and disposed on the middle shield layer 75 and the nonmagnetic layer 76, a contact sensor 78 disposed on the nonmagnetic layer 77, and a nonmagnetic layer 79 formed of a nonmagnetic material and disposed to cover the nonmagnetic layer 77 and the contact sensor 78. The nonmagnetic layers 77 and 79 are formed of alumina, for example. The contact sensor 78 will be described in detail later.

The magnetic head further includes a write head unit 9 disposed on the nonmagnetic layer 79. The middle shield layer 75 has the function of shielding the MR element 5 from magnetic fields generated in the write head unit 9. The write head unit 9 includes a coil, a main pole 15, and a write shield 16.

The coil produces a magnetic field corresponding to data to be written on the recording medium 100. The coil includes a first portion 20 and a second portion 10. The first portion 20 and the second portion 10 are both formed of a conductive material such as copper. The first portion 20 and the second portion 10 are connected in series or in parallel. The main pole 15 has an end face 15a located in the medium facing surface 90. The main pole 15 allows a magnetic flux corresponding to the magnetic field produced by the coil to pass, and produces a write magnetic field for writing data on the recording medium 100 by means of a perpendicular magnetic recording system. Consequently, a magnetic flux is produced from the end face 15a of the main pole 15 and magnetizes a portion of the recording medium 100. FIG. 2 shows a cross section that intersects the end face 15a of the main pole 15 located in the medium facing surface 90 and that is perpendicular to the medium facing surface 90 and to the top surface 1a of the substrate 1 (this cross section will hereinafter be referred to as the main cross section).

The write shield 16 has an end face located in the medium facing surface 90. The end face of the write shield 16 includes first to fourth end face portions 16Aa, 16Ba, 16Ca, and 16Da. The first end face portion 16Aa is located on the front side in the direction T of travel of the recording medium 100 relative to the end face 15a of the main pole 15. The second end face portion 16Ba is located on the rear side in the direction T of travel of the recording medium 100 relative to the end face 15a of the main pole 15. The third and fourth end face portions 16Ca and 16Da are located on opposite sides of the end face 15a of the main pole 15 in the track width direction TW. In the medium facing surface 90, the first to fourth end face portions 16Aa, 16Ba, 16Ca and 16Da are arranged to wrap around the end face 15a of the main pole 15.

The write shield 16 is formed of a magnetic material. Examples of materials that can be used for the write shield 16 include CoFeN, CoNiFe, NiFe, and CoFe.

The write head unit 9 further includes a first return path section 40 and a second return path section 30. The first return path section 40 and the second return path section 30 are each formed of a magnetic material. Examples of materials that can be used for the first and second return path sections 40 and 30 include CoFeN, CoNiFe, NiFe, and CoFe. The first return path section 40 and the second return path section 30 are in alignment with each other in a direction perpendicular to the top surface 1a of the substrate 1 with the main pole 15 interposed therebetween. The first return path section 40 is located on the front side in the direction T of travel of the recording medium 100 relative to the main pole 15, and connects the write shield 16 and part of the main pole 15 located away from the medium facing surface 90 to each other, thereby magnetically coupling the write shield 16 and the main pole 15 to each other. The second return path section 30 is located on the rear side in the direction T of travel of the recording medium 100 relative to the main pole 15, and connects the write shield 16 and part of the main pole 15 located away from the medium facing surface 90 to each other, thereby magnetically coupling the write shield 16 and the main pole 15 to each other.

The second return path section 30 includes a second yoke layer 31 and a second connecting portion 32. The second connecting portion 32 includes magnetic layers 33 and 34. The magnetic layer 33 lies on the nonmagnetic layer 79. The second yoke layer 31 and the magnetic layer 34 both lie on the magnetic layer 33. The magnetic layer 34 is located near the medium facing surface 90. The second yoke layer 31 is located farther from the medium facing surface 90 than is the magnetic layer 34. As shown in FIG. 4, the second portion 10 of the coil is wound approximately two turns around the second yoke layer 31. Each of the magnetic layers 33 and 34 has an end face located in the medium facing surface 90.

The second yoke layer 31 is in contact with a portion of the main pole 15 located away from the medium facing surface 90. More specifically, the second yoke layer 31 is in contact with a portion of a bottom end of the main pole 15 located away from the medium facing surface 90, which will be described later.

The magnetic head further includes: an insulating layer 51 formed of an insulating material, lying on the nonmagnetic layer 79 and surrounding the magnetic layer 33; an insulating film 52 formed of an insulating material and isolating the second portion 10 from the second yoke layer 31 and the magnetic layers 33 and 34; an insulating layer 53 formed of an insulating material and disposed in the space between adjacent turns of the second portion 10; and an insulating layer 54 formed of an insulating material and disposed around the second portion 10, the second yoke layer 31 and the magnetic layer 34. The top surfaces of the second portion 10, the second yoke layer 31, the magnetic layer 34, the insulating film 52, and the insulating layers 53 and 54 are even with each other. The magnetic head further includes an insulating layer 55 formed of an insulating material and lying on the second portion 10, the insulating film 52 and the insulating layers 53 and 54. The insulating layers 51, 54 and 55 and the insulating film 52 are formed of alumina, for example. The insulating layer 53 is formed of a photoresist, for example.

As shown in FIG. 3, the write shield 16 includes a first shield 16A, a second shield 16B, and two side shields 16C and 16D. The first shield 16A is located on the front side in the direction T of travel of the recording medium 100 relative to the main pole 15. The second shield 16B is located on the rear side in the direction T of travel of the recording medium 100 relative to the main pole 15. The two side shields 16C and 16D are located on opposite sides of the main pole 15 in the track width direction TW and magnetically couple the first shield 16A and the second shield 16B to each other.

As shown in FIG. 2 and FIG. 3, the first shield 16A includes the first end face portion 16Aa, and an inclined portion 16Ab facing toward a top surface of the main pole 15 to be described later. The inclined portion 16Ab will be described in detail later. As shown in FIG. 3, the second shield 16B includes the second end face portion 16Ba. The side shield 16C includes the third end face portion 16Ca. The side shield 16D includes the fourth end face portion 16Da.

The second shield 16B lies on the magnetic layer 34. The magnetic head further includes a nonmagnetic layer 56 formed of a nonmagnetic material. The nonmagnetic layer 56 lies on the insulating layer 55 and surrounds the second shield 16B. The nonmagnetic layer 56 is formed of alumina, for example.

The main pole 15 has the end face 15a, a top surface 15T (see FIG. 2) lying at the front end in the direction T of travel of the recording medium 100, a bottom end 15L (see FIG. 2) opposite to the top surface 15T, and first and second side parts (see FIG. 3) opposite to each other in the track width direction TW. The side shield 16C has a first sidewall opposed to the first side part of the main pole 15. The side shield 16D has a second sidewall opposed to the second side part of the main pole 15.

The side shields 16C and 16D are disposed on the second shield 16B. The magnetic head further includes a nonmagnetic film 18 formed of a nonmagnetic material. The nonmagnetic film 18 is arranged to extend along the sidewalls of the side shields 16C and 16D, the top surface of the second shield 16B and the top surface of the nonmagnetic layer 56. The nonmagnetic material used to form the nonmagnetic film 18 may be an insulating material or a nonmagnetic metal material. Alumina is an example of an insulating material that can be used to form the nonmagnetic film 18. Ru is an example of a nonmagnetic metal material that can be used to form the nonmagnetic film 18.

The main pole 15 lies over the second shield 16B and the nonmagnetic layer 56 with the nonmagnetic film 18 interposed between the main pole 15 and the top surface of each of the second shield 16B and the nonmagnetic layer 56. As shown in FIG. 3, the nonmagnetic film 18 is interposed also between the main pole 15 and the side shields 16C and 16D.

A portion of the bottom end 15L of the main pole 15 located away from the medium facing surface 90 is in contact with the top surface of the second yoke layer 31. The main pole 15 may be formed of, for example, a magnetic metal material containing any of Ni, Fe and Co, such as NiFe, CoNiFe, or CoFe. The shape of the main pole 15 will be described in detail later.

The magnetic head further includes an expansion member 80 that is located farther from the medium facing surface 90 than is the main pole 15 and lies on the insulating film 52 and the insulating layer 54. The expansion member 80 is adjacent to the main pole 15 in a direction perpendicular to the medium facing surface 90. In the example shown in FIG. 2 and FIG. 5, the expansion member 80 is in contact with the main pole 15. However, there may be an insulating film interposed between the main pole 15 and the expansion member 80.

The expansion member 80 has a linear expansion coefficient higher than that of the main pole 15. In the present embodiment, the expansion member 80 is formed of a nonmagnetic metal material. Where the main pole 15 is formed of a magnetic metal material containing any of Ni, Fe and Co, the nonmagnetic metal material used to form the expansion member 80 has a linear expansion coefficient higher than that of each of Ni, Fe and Co. Each of Ni, Fe and Co has a linear expansion coefficient in the range of 12 to 13×10$^{-6}$/° C. The nonmagnetic metal material used to form the expansion member 80 need only have a linear expansion coefficient clearly higher than that of each of Ni, Fe and Co mentioned above. Examples of such a material include Cu, Al, Ag, and Sn. Cu has a linear expansion coefficient in the range of 16 to 17×10$^{-6}$/° C. Al has a linear expansion coefficient in the range of 23 to 24×10$^{-6}$/° C. Ag has a linear expansion coefficient in the range of 19 to 20×10$^{-6}$/° C. Sn has a linear expansion coefficient in the range of 23 to 27×10$^{-6}$/° C.

The magnetic head further includes a nonmagnetic layer 60 formed of a nonmagnetic material and disposed around the main pole 15, the side shields 16C and 16D and the expansion member 80. The nonmagnetic layer 60 is formed of alumina, for example.

The magnetic head further includes an insulating layer 81 formed of an insulating material. The insulating layer 81 lies on the top surfaces of the expansion member 80 and the nonmagnetic layer 60. The insulating layer 81 is formed of alumina, for example.

The magnetic head further includes a heater 82 disposed on the insulating layer 81, an insulating layer 83 formed of an insulating material and covering the insulating layer 81 and the heater 82, and a metal portion 84 formed of a metal material and adjacent to the expansion member 80. The insulating layer 83 is formed of alumina, for example. The metal material used to form the metal portion 84 may be a magnetic metal material or a nonmagnetic metal material. In the case of forming the metal portion 84 of a magnetic metal material, any of CoFeN, CoNiFe, NiFe and CoFe, for example, may be selected. In the case of forming the metal portion 84 of a nonmagnetic metal material, any of Cu, Al, Ag and Sn, for example, may be selected as in the case of the expansion member 80. The same nonmagnetic metal material may be used to form the metal portion 84 and the expansion member 80.

The heater 82 is to heat the expansion member 80, and is located away from the medium facing surface 90. The metal portion 84 is disposed with the heater 82 interposed between the metal portion 84 and the expansion member 80. The insulating layer 83 is interposed between the heater 82 and the metal portion 84. In the example shown in FIG. 2, the bottom surface of the metal portion 84 around the heater 82 is in contact with the top surface of the expansion member 80. The metal portion 84 may be in non-contact with the expansion member 80. In such a case, the insulating layers 81 and 83 are interposed between the expansion member 80 and the metal portion 84. The heater 82 will be described in more detail later.

The first return path section 40 includes a first yoke layer 41 and a first connecting portion 42. The first connecting portion 42 is formed of a single magnetic layer 43. The first yoke layer 41 is located away from the medium facing surface 90 and in contact with a portion of the main pole 15 located away from the medium facing surface 90. More specifically, the first yoke layer 41 is in contact with a portion of the top surface 15T of the main pole 15 located away from the medium facing surface 90. The metal portion 84 is located farther from the medium facing surface 90 than is the first yoke layer 41 and separated from the first return path section 40 and the second return path section 30.

In the case of employing a magnetic metal material as the metal material to form the metal portion 84, the metal portion 84 and the first yoke layer 41 may be formed of one and the same magnetic metal material. In such a case, it is possible to form the metal portion 84 and the first yoke layer 41 simultaneously. The first yoke layer 41 and the metal portion 84 are disposed such that an imaginary plane passing through the first yoke layer 41 and the metal portion 84 can lie parallel to the top surface 1a of the substrate 1.

The magnetic head further includes an insulating layer 58 formed of an insulating material, located away from the medium facing surface 90 and lying on a portion of the top surface 15T of the main pole 15. The insulating layer 58 is formed of alumina, for example.

The first portion 20 of the coil includes a first layer 21 and a second layer 22. The first layer 21 lies on the insulating layer 58. As shown in FIG. 6, the first layer 21 is wound approximately one turn around the first yoke layer 41 and the metal portion 84. The magnetic head further includes an insulating layer 59 lying on the first layer 21. The insulating layer 59 is formed of alumina, for example.

The magnetic head further includes a first insulating film 19 formed of an insulating material. The first insulating film 19 is disposed to cover the main pole 15, the first layer 21 and the insulating layers 58 and 59. The first insulating film 19 is formed of alumina, for example. The insulating layer 59 may be omitted. In such a case, the first insulating film 19 covers the top surface of the first layer 21.

The magnetic head further includes a second insulating film 61 formed of an insulating material and lying on the first insulating film 19, and a third insulating film 62 formed of an insulating material and lying on the second insulating film 61. The second and third insulating films 61 and 62 are formed of alumina, for example. Each of the second and third insulating films 61 and 62 has a thickness in the range of, for example, 30 to 100 nm, and preferably in the range of 50 to 80 nm. The shapes and locations of the second and third insulating films 61 and 62 will be described in detail later.

The first shield 16A lies on the side shields 16C and 16D and the first to third insulating films 19, 61 and 62. In the medium facing surface 90, the first end face portion 16Aa of the first shield 16A is at a predetermined distance from the end face 15a of the main pole 15. To make full use of the function of the first shield 16A, it is preferred that the distance between the end face 15a of the main pole 15 and the first end face portion 16Aa of the end face 16A of the write shield 16 in the medium facing surface 90 be relatively small. This distance is determined by and substantially equal to the thickness of the first insulating film 19. The thickness of the first insulating film 19 falls within the range of, for example, 5 to 60 nm, and preferably within the range of 30 to 60 nm. The end face 15a of the main pole 15 has a side adjacent to the first insulating film 19. This side of the end face 15a defines the track width.

The insulating layer 58 has an end face facing toward the inclined portion 16Ab of the first shield 16A. The insulating layer 59 has an end face facing toward the medium facing surface 90. The distance from the medium facing surface 90 to an arbitrary point on the end face of each of the insulating layers 58 and 59 increases with increasing distance from the arbitrary point to the top surface 1a of the substrate 1.

The second layer 22 is located above the first layer 21. As shown in FIG. 7, the second layer 22 is wound one turn around the first yoke layer 41 and the metal portion 84. The magnetic head further includes an insulating film 63 formed of an insulating material and a nonmagnetic layer 64 formed of a nonmagnetic material. The insulating film 63 isolates the second layer 22 from the first shield 16A, the first yoke layer 41 and the third insulating film 62. The nonmagnetic layer 64 is disposed around the first layer 21, the second layer 22, the first shield 16A, the first yoke layer 41 and the metal portion 84. The insulating film 63 and the nonmagnetic layer 64 are formed of alumina, for example. The top surfaces of the first shield 16A, the second layer 22, the first yoke layer 41, the metal portion 84, the insulating film 63 and the nonmagnetic layer 64 are even with each other.

The magnetic head further includes an insulating layer 65 formed of an insulating material and disposed over the top surfaces of the second layer 22 and the insulating film 63. The insulating layer 65 is formed of alumina, for example. The magnetic layer 43 is disposed over the first shield 16A, the first yoke layer 41 and the insulating layer 65, and connects the first shield 16A and the first yoke layer 41 to each other.

The magnetic head further includes a nonmagnetic layer 66 formed of a nonmagnetic material and disposed around the magnetic layer 43, and a protective layer 70 formed of a nonmagnetic material and disposed to cover the write head unit 9. The nonmagnetic layer 66 and the protective layer 70 are formed of, for example, an inorganic insulating material such as alumina.

As has been described, the magnetic head according to the present embodiment includes the medium facing surface 90, the read head unit 8, the write head unit 9, the heater 72, and the contact sensor 78. The read head unit 8 is located on the leading side or the rear side in the direction T of travel of the recording medium 100 relative to the write head unit 9.

The heater 72 is located on the leading side or the rear side in the direction T of travel of the recording medium 100 relative to the read head unit 8. The heater 72 is provided for allowing part of the medium facing surface 90, mainly the end face of the read head unit 8 located in the medium facing surface 90, to protrude toward the recording medium 100. The heater 72 includes a line-shaped conductor that generates heat when energized. The line-shaped conductor may be meandering in shape. The magnetic head according to the present embodiment includes a pair of leads (not illustrated) that are connected to opposite ends of the line-shaped conductor. The line-shaped conductor is configured to be energized through the pair of leads to thereby generate heat. For example, the line-shaped conductor is formed of a film of NiCr or a layered film consisting of Ta, NiCu, and Ta films.

The heat generated by the line-shaped conductor is transferred to a plurality of components of the magnetic head located near the heater 72, such as the read shield layers 3 and 7 and the middle shield layer 75. The plurality of components of the magnetic head located near the heater 72 are thus heated by the heater 72. These components expand when heated. As a result, part of the medium facing surface 90, mainly the end face of the read head unit 8, protrudes toward the recording medium 100.

The contact sensor 78 is disposed between the read head unit 8 and the write head unit 9. The contact sensor 78 is provided for detecting contact of part of the medium facing surface 90 with the recording medium 100. The contact sensor 78 is a resistor that varies in resistance with a change in its own temperature upon contact of part of the medium facing surface 90 with the recording medium 100. The resistor extends in the track width direction TW. The magnetic head according to the present embodiment includes a pair of leads (not illustrated) that are connected to opposite ends of the resistor. The resistor is formed of a metal material or a semiconductor material that varies in resistance at a relatively high rate with respect to a change in temperature, i.e., that has a relatively high temperature coefficient of resistance. Specifically, the material for the resistor may be NiFe, W, Cu, Ni, or Pt, for example.

Upon contact of part of the medium facing surface 90 with the recording medium 100, the frictional heat resulting from the contact raises the temperature of the medium facing surface 90 at and in the vicinity of the part in contact with the recording medium 100. Such a rise in temperature also raises the temperature of the contact sensor 78 (the resistor) itself. As a result, the contact sensor 78 varies in resistance. It is thus possible to detect contact of part of the medium facing surface 90 with the recording medium 100 by measuring the resistance of the contact sensor 78 through the pair of leads.

The write head unit 9 includes the coil including the first portion 20 and the second portion 10, the main pole 15, the write shield 16, the first return path section 40 and the second return path section 30, the first to third insulating films 19, 61 and 62, the expansion member 80, the heater 82, and the metal portion 84. The write shield 16 includes the first shield 16A, the second shield 16B, and the two side shields 16C and 16D. The first return path section 40 and the second return path section 30 are in alignment with each other in the direction perpendicular to the top surface 1a of the substrate 1 with the main pole 15 interposed therebetween.

The first return path section 40 includes the first yoke layer 41 and the first connecting portion 42. The first connecting portion 42 is formed of the magnetic layer 43 and located on the front side in the direction T of travel of the recording medium 100 relative to the first shield 16A and the first yoke layer 41. The first return path section 40 connects the write shield 16 (the first shield 16A) and part of the main pole 15 located away from the medium facing surface 90 to each other so that a first space S1 is defined by the main pole 15, the write shield 16 and the first return path section 40 (the first yoke layer 41 and the first connecting portion 42).

The second return path section 30 includes the second yoke layer 31 and the second connecting portion 32. The second connecting portion 32 includes the magnetic layers 33 and 34 and is located on the rear side in the direction T of travel of the recording medium 100 relative to the second shield 16B and the second yoke layer 31. The second return path section 30 connects the write shield 16 (the second shield 16B) and part of the main pole 15 located away from the medium facing surface 90 to each other so that a second space S2 is defined by the main pole 15, the write shield 16 and the second return path section 30 (the second yoke layer 31 and the second connecting portion 32).

The expansion member 80 is located farther from the medium facing surface 90 than is the main pole 15, and is adjacent to the main pole 15 in the direction perpendicular to the medium facing surface 90. The heater 82 and the metal portion 84 are located on the front side in the direction T of travel of the recording medium 100 relative to the expansion member 80. The expansion member 80 and the metal portion 84 define therebetween a receiving space 150 for receiving at least part of the heater 82. In the present embodiment, the metal portion 84 has a recess 84a that opens in the bottom surface of the metal portion 84. The recess 84a extends in the track width direction TW. The receiving space 150 is a space located between the recess 84a and the top surface of the expansion member 80.

At least part of the heater 82 is received in the receiving space 150. The heater 82 includes a line-shaped conductor 82A that generates heat when energized. As shown in FIG. 5, the line-shaped conductor 82A includes two linear portions 82A1 and 82A2 extending linearly in the track width direction TW, and a connecting portion 82A3 connecting one end of the linear portion 82A1 to one end of the linear portion 82A2. The connecting portion 82A3 is U-shaped, for example. The linear portion 82A2 is located farther from the medium facing surface 90 than is the linear portion 82A1. A part of each of the linear portions 82A1 and 82A2 is located in the receiving space 150. One end and the other end of the linear portion 82A1, one end and the other end of the linear portion 82A2, and the connecting portion 82A3 are located outside the receiving space 150.

The magnetic head according to the present embodiment includes a pair of leads 87 and 88 connected to the other end of the linear portion 82A1 and the other end of the linear portion 82A2, respectively. The line-shaped conductor 82A is configured to be energized through the pair of leads 87 and 88 to thereby generate heat. In FIG. 5, the boundary between the linear portion 82A1 and the lead 87 and the boundary between the linear portion 82A2 and the lead 88 are shown by broken lines. For example, the line-shaped conductor 82A is formed of a film of NiCr or a layered film consisting of Ta, NiCu, and Ta films. The function of the heater 82 will be described in detail later.

The magnetic head further includes an insulating portion formed of an insulating material and insulating the line-shaped conductor 82A from the expansion member 80 and the metal portion 84. The insulating portion is constituted of a portion of the insulating layer 81 that is located between the line-shaped conductor 82A and the expansion member 80 and a portion of the insulating layer 83 that is located between the line-shaped conductor 82A and the metal portion 84.

Figure 1:
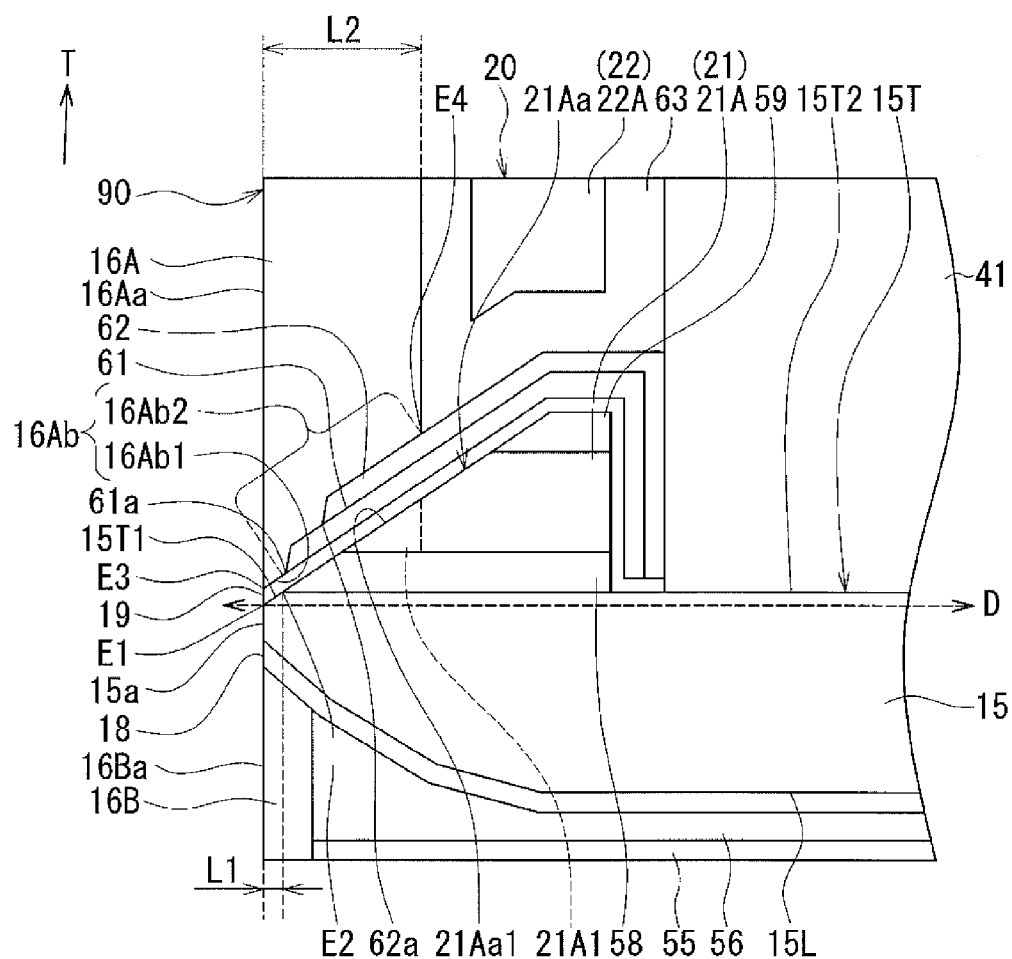
FIG. 1 is a cross-sectional view showing the main part of a magnetic head according to a first embodiment of the invention.

The first portion 20 and the second portion 10 of the coil will now be described in detail with reference to FIG. 1 and FIG. 4 to FIG. 7. FIG. 1 is a cross-sectional view showing the main part of the magnetic head according to the present embodiment. Note that FIG. 1 shows the main cross section. As shown in FIG. 4, the second portion 10 is wound approximately two turns around the second yoke layer 31. The second portion 10 includes two coil elements 10A and 10B extending to pass through the second space S2. Note that the coil elements refer to part of the coil winding. The coil elements 10A and 10B are arranged in this order in the direction perpendicular to the medium facing surface 90, the coil element 10A being closer to the medium facing surface 90 than the coil element 10B. The second portion 10 has a coil connection 10S electrically connected to the first portion 20.

The coil elements 10A and 10B are located near the main pole 15 to pass between the magnetic layer 34 and the second yoke layer 31. The coil elements 10A and 10B correspond to the at least one second coil element of the present invention. Since the second portion 10 is part of the coil, the coil can be said to include the second coil elements 10A and 10B.

As shown in FIG. 6, the first layer 21 of the first portion 20 is wound approximately one turn around the first yoke layer 41 and the metal portion 84. The first layer 21 includes a coil element 21A extending to pass between the first shield 16A and the first yoke layer 41, in particular, within the first space S1. As shown in FIG. 1, the coil element 21A has an end face 21Aa facing toward the inclined portion 16Ab of the first shield 16A. The distance from the medium facing surface 90 to an arbitrary point on the end face 21Aa of the coil element 21A increases with increasing distance from the arbitrary point to the top surface 1a of the substrate 1. The first layer 21 has a coil connection 21E electrically connected to the second layer 22.

As shown in FIG. 7, the second layer 22 of the first portion 20 is wound one turn around the first yoke layer 41 and the metal portion 84. The second layer 22 includes a coil element 22A extending to pass between the first shield 16A and the first yoke layer 41, in particular, within the first space S1. The second layer 22 has a coil connection 22S penetrating the insulating layer 59 and the insulating films 61 to 63 and electrically connected to the coil connection 21E of the first layer 21, and a coil connection 22E electrically connected to the coil connection 10S of the second portion 10.

The coil connection 22E is electrically connected to the coil connection 10S via a lead layer 85 and a connecting layer 86 shown in FIG. 4 to FIG. 6. The lead layer 85 lies on the insulating layer 55 at a position farther from the medium facing surface 90 than the expansion member 80, penetrates the insulating layer 55 and is electrically connected to the coil connection 10S. The connecting layer 86 lies on the lead layer 85. The coil connection 22E penetrates the insulating layer 59 and the insulating films 61 to 63 and is electrically connected to the connecting layer 86. The lead layer 85 and the connecting layer 86 are each formed of a conductive material such as copper. In the example shown in FIG. 4 to FIG. 7, the first portion 20 and the second portion 10 are connected in series.

The coil elements 21A and 22A correspond to the at least one first coil element of the present invention. The at least one first coil element includes one specific coil element. In the present embodiment, the coil element 21A is the one specific coil element. Since the first layer 21 and the second layer 22 are part of the coil, the coil can be said to include the first coil elements 21A and 22A.

Reference is now made to FIG. 4, FIG. 6 and FIG. 7 to describe the shapes of the first shield 16A, the second shield 16B, the first yoke layer 41, the second yoke layer 31 and the magnetic layers 33, 34 and 43 in detail. As shown in FIG. 6 and FIG. 7, the first shield 16A includes a central portion, and two side portions located on opposite sides of the central portion in the track width direction TW. The central portion includes the first end face portion 16Aa of the first shield 16A, and is disposed to intersect the main cross section. The two side portions are greater than the central portion in maximum length in the direction perpendicular to the medium facing surface 90.

As shown in FIG. 4, the magnetic layer 34 includes a central portion, and two side portions located on opposite sides of the central portion in the track width direction TW. The central portion includes the end face of the magnetic layer 34 located in the medium facing surface 90, and is disposed to intersect the main cross section. The two side portions are greater than the central portion in maximum length in the direction perpendicular to the medium facing surface 90. Although not illustrated, the second shield 16B also includes a central portion and two side portions. The central portion includes the second end face portion 16Ba of the second shield 16B and intersects the main cross section.

The first shield 16A, the first yoke layer 41 and the magnetic layer 43 constitute a first coil surrounding portion shaped to surround a part of the first portion 20. The first coil surrounding portion has a first end face constituted of the first end face portion 16Aa of the first shield 16A and the end face of the magnetic layer 43. The first coil surrounding portion defines a space (hereinafter referred to as the first coil receiving space) whose width in the track width direction TW increases with increasing distance from the medium facing surface 90. As shown in FIG. 6 and FIG. 7, the width of the first end face in the track width direction TW is smaller than the maximum width of the first coil receiving space in the track width direction TW.

Likewise, the second shield 16B, the second yoke layer 31 and the magnetic layers 33 and 34 constitute a second coil surrounding portion shaped to surround a part of the second portion 10. The second coil surrounding portion has a second end face constituted of the second end face portion 16Ba of the second shield 16B and the respective end faces of the magnetic layers 33 and 34. The second coil surrounding portion defines a space (hereinafter referred to as the second coil receiving space) whose width in the track width direction TW increases with increasing distance from the medium facing surface 90. As shown in FIG. 4, the width of the second end face in the track width direction TW is smaller than the maximum width of the second coil receiving space in the track width direction TW.

The shape of the main pole 15 will now be described in detail with reference to FIG. 1 to FIG. 3 and FIG. 5. As shown in FIG. 5, the main pole 15 includes a track width defining portion 15A and a wide portion 15B. The track width defining portion 15A has an end face located in the medium facing surface 90, and an end opposite to the end face. The wide portion 15B is connected to the end of the track width defining portion 15A. As shown in FIG. 1 to FIG. 3, the main pole 15 has the top surface 15T lying at the front end in the direction T of travel of the recording medium 100, the bottom end 15L opposite to the top surface 15T, the first side part, and the second side part. The width of the top surface 15T in the track width direction TW is greater in the wide portion 15B than in the track width defining portion 15A.

In the track width defining portion 15A, the width of the top surface 15T in the track width direction TW is generally constant regardless of distance from the medium facing surface 90. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 90, then becoming constant. Here, the length of the track width defining portion 15A in the direction perpendicular to the medium facing surface 90 will be referred to as the neck height. The neck height falls within the range of 0 to 0.3 µm, for example. A zero neck height means that the track width defining portion 15A is not provided and an end face of the wide portion 15B is thus located in the medium facing surface 90.

The top surface 15T includes an inclined surface portion 15T1 and a flat surface portion 15T2 arranged in this order, the inclined surface portion 15T1 being closer to the medium facing surface 90 than the flat surface portion 15T2. The inclined surface portion 15T1 has a first end E1 located in the medium facing surface 90 and a second end E2 opposite to the first end E1. The flat surface portion 15T2 is connected to the second end E2 of the inclined surface portion 15T1.

The inclined surface portion 15T1 is inclined relative to the medium facing surface 90 and the direction perpendicular to the medium facing surface 90 such that the second end E2 is located on the front side in the direction T of travel of the recording medium 100 relative to the first end E1. In FIG. 1 the broken arrow labeled D indicates the direction perpendicular to the medium facing surface 90. The flat surface portion 15T2 extends substantially perpendicular to the medium facing surface 90.

The bottom end 15L includes an inclined portion and a flat portion arranged in this order, the inclined portion being closer to the medium facing surface 90 than the flat portion. The inclined portion of the bottom end 15L has a first end located in the medium facing surface 90 and a second end opposite to the first end. The inclined portion of the bottom end 15L may be an edge formed by two intersecting planes, or may be a plane connecting two planes to each other. The flat portion of the bottom end 15L is a plane connected to the second end of the inclined portion of the bottom end 15L. The inclined portion of the bottom end 15L is inclined relative to the medium facing surface 90 and the direction D perpendicular to the medium facing surface 90 such that the second end is located on the rear side in the direction T of travel of the recording medium 100 relative to the first end. The flat portion extends substantially perpendicular to the medium facing surface 90.

The end face 15a of the main pole 15 located in the medium facing surface 90 has a first side adjacent to the first insulating film 19, a second side connected to one end of the first side, and a third side connected to the other end of the first side. The first side defines the track width. The position of an end of a record bit to be recorded on the recording medium 100 is determined by the position of the first side. The width in the track width direction TW of the end face 15a of the main pole 15 located in the medium facing surface 90 decreases with increasing distance from the first side, that is, with increasing proximity to the top surface 1a of the substrate 1. Each of the second side and the third side forms an angle of, for example, 7° to 17°, or preferably 10° to 15°, relative to the direction perpendicular to the top surface 1a of the substrate 1. The first side has a length in the range of 0.05 to 0.20 µm, for example.

The shapes of the inclined portion 16Ab and the coil element 21A will now be described in detail with reference to FIG. 1. As previously mentioned, the first shield 16A includes the inclined portion 16Ab. The inclined portion 16Ab faces toward the top surface 15T of the main pole 15. The inclined portion 16Ab has a third end E3 located in the medium facing surface 90 and a fourth end E4 opposite to the third end E3. The inclined portion 16Ab is inclined relative to the medium facing surface 90 and the direction D perpendicular to the medium facing surface 90 such that the fourth end E4 is located on the front side in the direction T of travel of the recording medium 100 relative to the third end E3.

The inclined portion 16Ab includes a first portion 16Ab1 opposed to the inclined surface portion 15T1 of the top surface 15T, and a second portion 16Ab2 that is contiguous with the first portion 16Ab1 and is located farther from the medium facing surface 90 than is the first portion 16Ab1. The specific coil element 21A includes an interposition part 21A1 that is located closer to the medium facing surface 90 than is the fourth end E4 of the inclined portion 16Ab and interposed between the flat surface portion 15T2 of the top surface 15T and the second portion 16Ab2 of the inclined portion 16Ab. The interposition part 21A1 has an end face 21Aa1 facing toward the inclined portion 16Ab. In the example shown in FIG. 1, the end face 21Aa1 of the interposition part 21A1 is a part of the end face 21Aa of the specific coil element 21A.

The first yoke layer 41 of the first return path section 40 is disposed with the specific coil element 21A interposed between the first yoke layer 41 and the inclined portion 16Ab. The insulating layer 58 is disposed between the specific coil element 21A and the flat surface portion 15T2 of the top surface 15T. The insulating layer 59 lies on the specific coil element 21A. The inclined surface portion 15T1 of the top surface 15T, the end face of the insulating layer 58, the end face 21Aa of the specific coil element 21A, and the end face of the insulating layer 59 are coplanar.

Here, as shown in FIG. 1, the length of the inclined surface portion 15T1 of the top surface 15T in the direction perpendicular to the medium facing surface 90 will be designated by the symbol L1, and the length of the inclined portion 16Ab in the direction perpendicular to the medium facing surface 90 will be designated by the symbol L2. The length L1 is smaller than the length L2. The length L1 falls within the range of 0.05 to 0.15 µm, for example. The length L2 falls within the range of 0.1 to 0.5 µm, for example. The neck height can be set to any value independently of the lengths L1 and L2.

The minimum distance between the specific coil element 21A and the medium facing surface 90 falls within the range of 0.1 to 0.25 µm, for example. The minimum distance between the first yoke layer 41 and the medium facing surface 90 falls within the range of 0.7 to 1.2 μm, for example. In the main cross section, the length of the coil element 22A in the direction perpendicular to the medium facing surface 90 is about 0.4 μm, for example. The specific coil element 21A has a thickness in the range of 0.3 to 0.7 μm, for example.

The shapes and locations of the insulating films 19, 61 and 62 will now be described in detail with reference to FIG. 1. As shown in FIG. 1, the first insulating film 19 is interposed between the inclined surface portion 15T1 and the first portion 16Ab1 of the inclined portion 16Ab and between the end face 21Aa1 of the interposition part 21A1 and the second portion 16Ab2 of the inclined portion 16Ab. The second insulating film 61 is interposed between the first insulating film 19 and the second portion 16Ab2 of the inclined portion 16Ab. The third insulating film 62 is interposed between the second insulating film 61 and the second portion 16Ab2 of the inclined portion 16Ab. The first insulating film 19 has a first front end located in the medium facing surface 90. The second insulating film 61 has a second front end 61a closest to the medium facing surface 90. The third insulating film 62 has a third front end 62a closest to the medium facing surface 90.

The second front end 61a is located at a distance from the medium facing surface 90. The distance from the medium facing surface 90 to the second front end 61a may be greater than or equal to the distance from the medium facing surface 90 to the second end E2 of the inclined surface portion 15T1 (the same as the length L1) and smaller than or equal to the distance from the medium facing surface 90 to the interposition part 21A1. The distance from the medium facing surface 90 to the second front end 61a falls within the range of 0.05 to 0.25 μm, for example.

The third front end 62a is located farther from the medium facing surface 90 than is the second front end 61a. The distance from the medium facing surface 90 to the third front end 62a may be greater than the distance from the medium facing surface 90 to the second front end 61a and smaller than or equal to the distance from the medium facing surface 90 to the interposition part 21A1. In this case, the distance from the medium facing surface 90 to the second front end 61a may be greater than or equal to the distance from the medium facing surface 90 to the second end E2 of the inclined surface portion 15T1 and smaller than the distance from the medium facing surface 90 to the interposition part 21A1.

In the example shown in FIG. 1, the distance from the medium facing surface 90 to the second front end 61a is greater than the distance from the medium facing surface 90 to the second end E2 of the inclined surface portion 15T1. Accordingly, the second insulating film 61 is not interposed between the inclined surface portion 15T1 of the top surface 15T and the first portion 16Ab1 of the inclined portion 16Ab but the first insulating film 19 is only interposed therebetween. Further, in the example shown in FIG. 1, the distance from the medium facing surface 90 to the second front end 61a and the distance from the medium facing surface 90 to the third front end 62a are both smaller than the distance from the medium facing surface 90 to the interposition part 21A1. Accordingly, the first to third insulating films 19, 61 and 62 are interposed between the end face 21Aa1 of the interposition part 21A1 and the second portion 16Ab2 of the inclined portion 16Ab.

The function and effects of the magnetic head according to the present embodiment will now be described. The magnetic head writes data on the recording medium 100 by using the write head unit 9 and reads data stored on the recording medium 100 by using the read head unit 8. In the write head unit 9, the coil including the first portion 20 and the second portion 10 produces magnetic fields corresponding to data to be written on the recording medium 100. A magnetic flux corresponding to the magnetic field produced by the first portion 20 passes through the first return path section 40 and the main pole 15. A magnetic flux corresponding to the magnetic field produced by the second portion 10 passes through the second return path section 30 and the main pole 15. Consequently, the main pole 15 allows the magnetic flux corresponding to the magnetic field produced by the first portion 20 and the magnetic flux corresponding to the magnetic field produced by the second portion 10 to pass.

The first portion 20 and the second portion 10 may be connected in series or in parallel. In either case, the first portion 20 and the second portion 10 are connected such that the magnetic flux corresponding to the magnetic field produced by the first portion 20 and the magnetic flux corresponding to the magnetic field produced by the second portion 10 flow in the same direction through the main pole 15.

The main pole 15 allows the magnetic fluxes corresponding to the magnetic fields produced by the coil to pass as mentioned above, and produces a write magnetic field for writing data on the recording medium 100 by means of the perpendicular magnetic recording system.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 100. The write shield 16 also has the function of capturing a magnetic flux that is produced from the end face 15a of the main pole 15 and spreads in directions other than the direction perpendicular to the surface of the recording medium 100, and thereby preventing the magnetic flux from reaching the recording medium 100.

Furthermore, the write shield 16 and the first and second return path sections 40 and 30 have the function of allowing a magnetic flux that has been produced from the end face 15a of the main pole 15 and has magnetized a portion of the recording medium 100 to flow back. More specifically, a portion of the magnetic flux that has been produced from the end face 15a of the main pole 15 and has magnetized the portion of the recording medium 100 flows back to the main pole 15 through the write shield 16 and the first return path section 40. Another portion of the magnetic flux that has been produced from the end face 15a of the main pole 15 and has magnetized the portion of the recording medium 100 flows back to the main pole 15 through the write shield 16 and the second return path section 30.

The write shield 16 includes the first shield 16A, the second shield 16B and the two side shields 16C and 16D. The present embodiment thus makes it possible that, in regions on both the front side and the rear side in the direction T of travel of the recording medium 100 relative to the end face 15a of the main pole 15 and regions on opposite sides of the end face 15a of the main pole 15 in the track width direction TW, a magnetic flux that is produced from the end face 15a of the main pole 15 and spreads in directions other than the direction perpendicular to the surface of the recording medium 100 can be captured and thereby prevented from reaching the recording medium 100. Consequently, the present embodiment makes it possible to prevent the occurrence of unwanted erasure.

Further, in the present embodiment, the top surface 15T of the main pole 15 includes the inclined surface portion 15T1, and the bottom end 15L of the main pole 15 includes the inclined portion. This feature of the present embodiment allows the main pole 15 to have a small thickness in the medium facing surface 90, and thereby allows for prevention of the unwanted erasure induced by a skew. On the other hand, since a portion of the main pole 15 located away from the medium facing surface 80 can have a large thickness, it is possible for the main pole 15 to guide much magnetic flux to the medium facing surface 90. This allows for the improvement of write characteristics such as the overwrite property.

Further, in the present embodiment, the length L1 of the inclined surface portion 15T1 in the direction perpendicular to the medium facing surface 90 is smaller than the length L2 of the inclined portion 16Ab of the first shield 16A in the direction perpendicular to the medium facing surface 90. This allows for a reduction in the area in which the inclined surface portion 15T1 and the inclined portion 16Ab are opposed to each other, and thereby allows for prevention of leakage of magnetic flux from the main pole 15 to the write shield 16 (the first shield 16A).

By virtue of the features of the shape of the main pole 15 and the features associated with the relation between the main pole 15 and the write shield 16 (the first shield 16A) described above, the present embodiment makes it possible to prevent the unwanted erasure induced by a skew and to provide improved write characteristics.

In the present embodiment, the coil elements 21A and 22A are arranged to pass between the first shield 16A and the first yoke layer 41. This allows for placement of the coil elements 21A and 22A in the first space S1 with high space utilization efficiency, and consequently allows for a reduction in length of a magnetic path that passes through the write shield 16, the first return path section 40 and the main pole 15. The present embodiment thus makes it possible to improve the rate of change in the direction of magnetic flux produced from the end face 15a of the main pole 15.

In the present embodiment, in particular, the coil element 21A includes the interposition part 21A1 interposed between the flat surface portion 15T2 of the top surface 15T and the second portion 16Ab2 of the inclined portion 16Ab. More specifically, in the present embodiment, the interposition part 21A1 of the coil element 21A is disposed in a space that is produced between the flat surface portion 15T2 and the second portion 16Ab2 by the features associated with the relation between the main pole 15 and the first shield 16A described above. The present embodiment thus allows for placement of the coil elements in the first space S1 with higher space utilization efficiency, and consequently allows for a further reduction in length of the magnetic path passing through the write shield 16, the first return path section 40 and the main pole 15.

In the present embodiment, the coil elements 10A and 10B are located near the main pole 15 to pass between the magnetic layer 34 and the second yoke layer 31. This allows for placement of the coil elements 10A and 10B in the second space S2 with high space utilization efficiency, and consequently allows for a reduction in length of a magnetic path that passes through the write shield 16, the second return path section 30 and the main pole 15. The present embodiment thus makes it possible to improve the rate of change in the direction of magnetic flux produced from the end face 15a of the main pole 15.

In the present embodiment, the first to third insulating films 19, 61 and 62 are interposed between the interposition part 21A1, which is a portion of the coil, and the second portion 16Ab2 of the inclined portion 16Ab of the write shield 16B (the first shield 16A). The first front end of the first insulating film 19 is located in the medium facing surface 90, whereas the second front end 61a of the second insulating film 61 and the third front end 62a of the third insulating film 62 are each located at a distance from the medium facing surface. The present embodiment thereby makes it possible to increase the insulation strength of the first to third insulating films 19, 61 and 62 interposed between the interposition part 21A1 and the second portion 16Ab2 of the inclined portion 16Ab, while allowing the distance between the end face 15a of the main pole 15 and the first end face portion 16Aa of the end face 16A of the write shield 16 in the medium facing surface 90 to be of a desired value determined by the thickness of the first insulating film 19. Consequently, the present embodiment makes it possible to prevent shorting of the coil and the write shield 16.

Now, assume that the first to third insulating films 19, 61 and 62 are replaced with a single insulating layer. In such a case, if the distance between the end face 15a of the main pole 15 and the first end face portion 16Aa of the end face 16A of the write shield 16 in the medium facing surface 90 is set to a desired value, the insulation strength of the insulating layer interposed between the interposition part 21A1 and the second portion 16Ab2 of the inclined portion 16Ab may decrease to cause shorting of the coil and the write shield 16. If the insulating layer is increased in thickness in order to avoid the shorting, the distance between the end face 15a of the main pole 15 and the first end face portion 16Aa of the end face 16A of the write shield 16 in the medium facing surface 90 will become excessively great.

The third insulating film 62 is omitted in a second embodiment to be described later. The present embodiment has the following advantage over the second embodiment. Specifically, by stacking the thin second and third insulating films 61 and 62 in such a manner that the third front end 62a is located farther from the medium facing surface 90 than is the second front end 61a as in the present embodiment, it becomes possible to achieve a reduction in height of a step to be created in the second portion 16Ab2 of the inclined portion 16Ab by one insulating film, when compared with the case of omitting the third insulating film 62 and making the second insulating film 61 thicker. The present embodiment thus makes it possible to prevent flux leakage from the inside to the outside of the first shield 16A resulting from the step created in the second portion 16Ab2.

Further, the present embodiment allows part of the main pole 15 located away from the medium facing surface 90 to be at a greater distance from the first shield 16A than in the case where the second and third insulating films 61 and 62 are not provided. The present embodiment thus makes it possible to prevent flux leakage from the main pole 15 to the write shield 16 (the first shield 16A) with higher reliability.

The function of the heater 82 will now be described in detail. The line-shaped conductor 82A of the heater 82 generates heat when energized. The heat generated by the line-shaped conductor 82A is transferred to the expansion member 80. The expansion member 80 is thus heated by the heater 82. The expansion member 80 expands by being heated, and applies to the main pole 15 a force in the direction from the expansion member 80 toward the medium facing surface 90. As a result, the end face 15a of the main pole 15 located in the medium facing surface 90 protrudes toward the recording medium 100. This reduces the distance from the end face 15a of the main pole 15 to the surface of the recording medium 100, thereby allowing for the enhancement of recording density.

Now, consider a magnetic head of a comparative example that does not include the expansion member 80 and the heater 82 but includes a substitute heater provided in the vicinity of the main pole 15. In the magnetic head of the comparative example, some components of the magnetic head other than the main pole 15, such as the first return path section 40, the second return path section 30 and the write shield 16, are also heated by the heater. It is therefore difficult for the magnetic head of the comparative example to allow the end face 15a of the main pole 15 to greatly protrude relative to its neighboring surroundings located in the medium facing surface 90. The magnetic head of the comparative example thus has a disadvantage that the distance from the end face 15a of the main pole 15 to the surface of the recording medium 100 cannot be sufficiently reduced and therefore it is not possible to achieve sufficiently high recording density. Further, for the magnetic head of the comparative example, the end face 15a of the main pole 15 does not always protrude by the greatest amount when compared with the other parts of the end face of the write head unit 9 located in the medium facing surface 90. If any part of the end face of the write head unit 9 other than the end face 15a of the main pole 15 protrudes by the greatest amount, there arises a problem that it is difficult to recognize and control the distance from the end face 15a of the main pole 15 to the surface of the recording medium 100. For the magnetic head provided with the write shield 16, in particular, the end face of the write shield 16 located around the end face 15a of the main pole 15 protrudes when the first and second return path sections 40 and 30 and the write shield 16 are heated. This makes the aforementioned problem more noticeable.

In contrast, in the present embodiment, at least part of the heater 82 is received in the receiving space 150 defined between the expansion member 80 and the metal portion 84. The expansion member 80 is located farther from the medium facing surface 90 than is the main pole 15. The metal portion 84 is separated from the first return path section 40 and the second return path section 30. The heat generated by the heater 82 is transferred to the expansion member 80 and the metal portion 84. The heat transferred from the heater 82 to the metal portion 84 is further transferred to the expansion member 80. The expansion member 80 is heated in this way. The metal portion 84 is located farther from the medium facing surface 90 than is the main pole 15 as with the expansion member 80, and is separated from the first return path section 40 and the second return path section 30. Thus, the heat generated by the heater 82 is less likely to be transferred to components of the magnetic head other than the expansion member 80 and the metal portion 84, particularly to the first return path section 40 and the second return path section 30.

Consequently, the present embodiment allows the expansion member 80 to be efficiently heated by the heater 82 while allowing components of the magnetic head other than the expansion member 80 and the metal portion 84 to be prevented from being heated by the heater 82. The present embodiment thus makes it possible to increase the amount of protrusion of the end face 15a of the main pole 15 while suppressing protrusion of portions located around the end face 15a of the main pole 15 in the medium facing surface 90.

Further, in the present embodiment, the expansion member 80 has a linear expansion coefficient higher than that of the main pole 15. The present embodiment thus allows for more efficient protrusion of the end face 15a of the main pole 15 when compared with the magnetic head of the comparative example configured to heat the main pole 15.

Further, the present embodiment allows the end face 15a of the main pole 15 to protrude by the greatest amount when compared with the other parts of the end face of the write head unit 9 located in the medium facing surface 90. The present embodiment thus makes it possible to recognize and control the distance from the end face 15a of the main pole 15 to the surface of the recording medium 100.

Now, a description will be given of an example of how to recognize and control the distance from the end face 15a of the main pole 15 to the surface of the recording medium 100. The amount of protrusion of the end face 15a of the main pole 15 has a correlation with the magnitude of supply power to the heater 82. Before shipment of a magnetic disk drive as a final product, the following test is performed. In the test, with the slider floated above the surface of a rotating recording medium 100, the magnitude of the power being supplied to the heater 82 is gradually increased to gradually increase the amount of protrusion of the end face 15a of the main pole 15. Upon contact of the end face 15a of the main pole 15 with the surface of the recording medium 100, the contact is detected by the contact sensor 78. This test determines the magnitude of supply power to the heater 82 at which the end face 15a of the main pole 15 comes into contact with the surface of the recording medium 100. Such magnitude of supply power will be referred to as "power at contact". At the time of shipment of a magnetic disk drive as a final product, the magnitude of supply power to the heater 82 is set to a predetermined value smaller than the power at contact. In this case, the distance from the end face 15a of the main pole 15 to the surface of the recording medium 100 can be recognized and controlled by the magnitude of supply power to the heater 82.

If the amount of protrusion of any part of the end face of the write head unit 9 other than the end face 15a of the main pole 15 is the greatest unlike the present embodiment, in the aforementioned test the contact sensor 78 detects a contact of the part other than the end face 15a of the main pole 15 with the surface of the recording medium 100. At this time, the distance from the end face 15a of the main pole 15 to the surface of the recording medium 100 is unknown. Thus, in this case, it is not possible to recognize and control the distance from the end face 15a of the main pole 15 to the surface of the recording medium 100.

It should be noted that in the present embodiment, the heater 72 can heat a plurality of components of the magnetic head located near the heater 72, and can thereby allow the end face of the read head unit 8 to protrude toward the recording medium 100 so as to reduce the distance from the read head unit 8 to the surface of the recording medium 100. This makes it possible to provide an increased recording density while preventing the reading capability of the read head unit 8 from being reduced with increases in recording density.

The other effects provided by the present embodiment will now be described. If the first end face of the first coil surrounding portion constituted of the first shield 16A, the first yoke layer 41 and the magnetic layer 43 is exposed over a large area in the medium facing surface 90, a portion of the magnetic flux captured into the first coil surrounding portion through a portion of the first end face located near the end face 15a of the main pole 15 may leak toward the recording medium 100 through another portion of the first end face. This may result in the occurrence of unwanted erasure. On the other hand, if the first coil surrounding portion is reduced in dimension in the track width direction TW, the first coil surrounding portion decreases in volume and thus becomes prone to flux saturation. This may result in leakage of magnetic flux from the first end face toward the recording medium 100, and may thereby induce unwanted erasure.

In the present embodiment, the first coil surrounding portion is shaped to form the first coil receiving space, that is, shaped to surround a part of the first portion 20. This allows the first coil surrounding portion to be large in volume. On the other hand, the width in the track width direction TW of the first end face constituted of the first end face portion 16Aa of the first shield 16A and the end face of the magnetic layer 43 is smaller than the maximum width in the track width direction TW of the first coil receiving space. This allows the first end face to be small in area. The present embodiment thus makes it possible that the first coil surrounding portion is large in volume while the first end face is small in area.

Likewise, the second coil surrounding portion constituted of the second shield 16B, the second yoke layer 31 and the magnetic layers 33 and 34 is shaped to form the second coil receiving space, that is, shaped to surround a part of the second portion 10. This allows the second coil surrounding portion to be large in volume. On the other hand, the width in the track width direction TW of the second end face of the second coil surrounding portion constituted of the second end face portion 16Ba of the second shield 16B and the respective end faces of the magnetic layers 33 and 34 is smaller than the maximum width in the track width direction TW of the second coil receiving space. This allows the second end face to be small in area. The present embodiment thus makes it possible that the second coil surrounding portion is large in volume while the second end face is small in area.

As discussed above, the present embodiment allows the first and second coil surrounding portions to be large in volume while allowing the first and second end faces exposed in the medium facing surface 90 to be small in area. Consequently, the present embodiment makes it possible to prevent leakage of magnetic flux from the first and second end faces that would occur in the case where the first and second end faces are exposed over a large area in the medium facing surface 90 or where the first and second coil surrounding portions are small in volume. The present embodiment thus allows for preventing unwanted erasure from occurring due to leakage of magnetic flux toward the recording medium 100 from the first and second end faces exposed in the medium facing surface 90.

Second Embodiment

Figure 8:
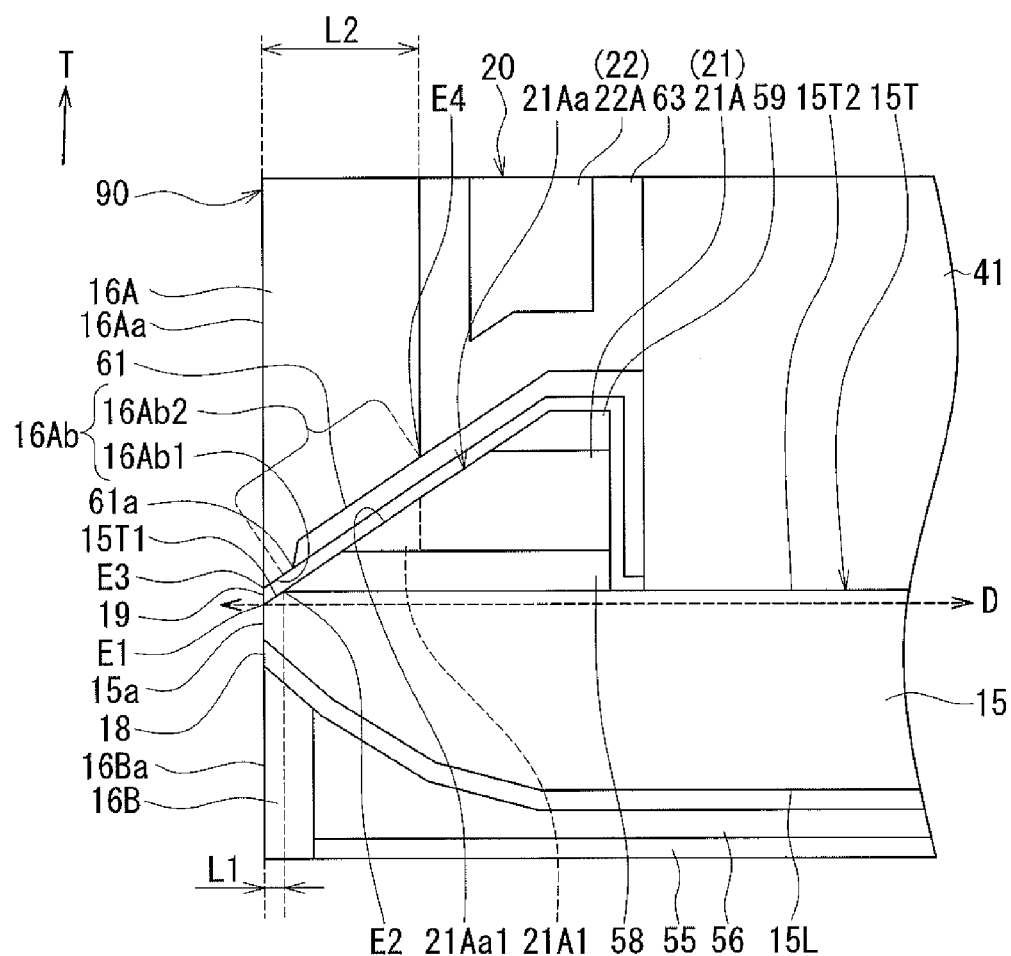
FIG. 8 is a cross-sectional view showing the main part of a magnetic head according to a second embodiment of the invention.

A magnetic head according to the second embodiment of the invention will now be described with reference to FIG. 8. FIG. 8 is a cross-sectional view showing the main part of the magnetic head according to the present embodiment. FIG. 8 shows the main cross section. The third insulating film 62 is not provided in the present embodiment.

As in the first embodiment, the second front end 61a of the second insulating film 61 is located at a distance from the medium facing surface 90. The distance from the medium facing surface 90 to the second front end 61a may be greater than or equal to the distance from the medium facing surface 90 to the second end E2 of the inclined surface portion 15T1 (the same as the length L1) and smaller than or equal to the distance from the medium facing surface 90 to the interposition part 21A1. In the example shown in FIG. 8, the distance from the medium facing surface 90 to the second front end 61a is greater than the distance from the medium facing surface 90 to the second end E2 of the inclined surface portion 15T1 and smaller than the distance from the medium facing surface 90 to the interposition part 21A1.

The present embodiment cannot provide the advantage resulting from the third insulating film 62 where included in the magnetic head. The remainder of configuration, function and effects of the present embodiment are similar to those of the first embodiment.

The present invention is not limited to the foregoing embodiments, and various modifications may be made thereto. For example, the magnetic head of the present invention may further include one or more insulating films interposed between the second portion 16Ab2 of the inclined portion 16Ab and the third insulating film 62 of the first embodiment.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:

a medium facing surface facing a recording medium;

a coil producing a magnetic field that corresponds to data to be written on the recording medium;

a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;

a write shield formed of a magnetic material and having an end face located in the medium facing surface; and a first return path section formed of a magnetic material and located on a front side in a direction of travel of the recording medium relative to the main pole, wherein the end face of the write shield includes a first end face portion located on the front side in the direction of travel of the recording medium relative to the end face of the main pole, the first return path section connects the write shield and part of the main pole located away from the medium facing surface to each other so that a first space is defined by the main pole, the write shield and the first return path section, the coil includes at least one first coil element extending to pass through the first space, the main pole has a top surface lying at a front end in the direction of travel of the recording medium, the top surface of the main pole includes an inclined surface portion and a flat surface portion arranged in this order, the inclined surface portion being closer to the medium facing surface than the flat surface portion, the inclined surface portion has a first end located in the medium facing surface and a second end opposite to the first end, the inclined surface portion is inclined relative to the medium facing surface and a direction perpendicular to the medium facing surface such that the second end is located on the front side in the direction of travel of the recording medium relative to the first end, the flat surface portion extends substantially perpendicular to the medium facing surface, the write shield includes an inclined portion facing toward the top surface of the main pole, the inclined portion has a third end located in the medium facing surface and a fourth end opposite to the third end, the inclined portion is inclined relative to the medium facing surface and the direction perpendicular to the medium facing surface such that the fourth end is located on the front side in the direction of travel of the recording medium relative to the third end, the inclined surface portion is smaller than the inclined portion in length in the direction perpendicular to the medium facing surface, the inclined portion includes a first portion opposed to the inclined surface portion, and a second portion that is contiguous with the first portion and is located farther from the medium facing surface than is the first portion, the at least one first coil element includes one specific coil element, the one specific coil element includes an interposition part that is located closer to the medium facing surface than is the fourth end and interposed between the flat surface portion and the second portion, the interposition part has an end face facing toward the inclined portion, the magnetic head further comprises a first insulating film and a second insulating film, the first insulating film is interposed between the inclined surface portion and the first portion of the inclined portion, and between the end face of the interposition part and the second portion of the inclined portion, the second insulating film is interposed between the first insulating film and the second portion of the inclined portion, the first insulating film has a first front end located in the medium facing surface, the second insulating film has a second front end closest to the medium facing surface, and the second front end of the second insulating film is located at a distance from the medium facing surface.

2. The magnetic head for perpendicular magnetic recording according to claim 1, wherein the distance from the medium facing surface to the second front end of the second insulating film is greater than or equal to a distance from the medium facing surface to the second end of the inclined surface portion and smaller than or equal to a distance from the medium facing surface to the interposition part.

3. The magnetic head for perpendicular magnetic recording according to claim 1, further comprising a third insulating film, wherein the third insulating film is interposed between the second insulating film and the second portion of the inclined portion, the third insulating film has a third front end closest to the medium facing surface, and the third front end is located farther from the medium facing surface than is the second front end.

4. The magnetic head for perpendicular magnetic recording according to claim 3, wherein the distance from the medium facing surface to the second front end of the second insulating film is greater than or equal to a distance from the medium facing surface to the second end of the inclined surface portion and smaller than a distance from the medium facing surface to the interposition part, and a distance from the medium facing surface to the third front end of the third insulating film is greater than the distance from the medium facing surface to the second front end of the second insulating film and smaller than or equal to the distance from the medium facing surface to the interposition part.

5. The magnetic head for perpendicular magnetic recording according to claim 1, further comprising an insulating layer disposed between the one specific coil element and the flat surface portion of the top surface of the main pole, wherein each of the one specific coil element and the insulating layer has an end face facing toward the inclined portion, and the inclined surface portion, the end face of the insulating layer and the end face of the one specific coil element are coplanar.

6. The magnetic head for perpendicular magnetic recording according to claim 1, wherein the end face of the write shield includes a second end face portion located on a rear side in the direction of travel of the recording medium relative to the end face of the main pole, the magnetic head further comprises a second return path section formed of a magnetic material and located on the rear side in the direction of travel of the recording medium relative to the main pole, the second return path section connects the write shield and part of the main pole located away from the medium facing surface to each other so that a second space is defined by the main pole, the write shield and the second return path section, and the coil includes at least one second coil element extending to pass through the second space.

7. The magnetic head for perpendicular magnetic recording according to claim 6, wherein the end face of the write shield further includes a third end face portion and a fourth end face portion, the third end face portion and the fourth end face portion being located on opposite sides of the end face of the main pole in a track width direction.

\* \* \* \* \*